United States Patent
Fenker et al.

(10) Patent No.: US 7,942,228 B2
(45) Date of Patent: May 17, 2011

(54) TRUCK WITH IMPROVED CONTROL

(75) Inventors: Oliver Fenker, Attenweiler (DE); Juergen Resch, Degernau (DE)

(73) Assignee: Liebherr-Werk Biberach GmbH, Biberach an der Riss (DE)

( * ) Notice: Subject to any disclaimer, the term of this patent is extended or adjusted under 35 U.S.C. 154(b) by 323 days.

(21) Appl. No.: 12/082,894

(22) Filed: Apr. 15, 2008

(65) Prior Publication Data

US 2008/0264709 A1 Oct. 30, 2008

(30) Foreign Application Priority Data

Apr. 16, 2007 (DE) .......... 10 2007 017 821

(51) Int. Cl.
*B60K 28/16* (2006.01)

(52) U.S. Cl. .......... 180/265; 701/82

(58) Field of Classification Search .......... 180/197, 180/254, 264, 265; 701/69, 82, 74, 84, 90
See application file for complete search history.

(56) References Cited

U.S. PATENT DOCUMENTS

| | | | | |
|---|---|---|---|---|
| 4,984,649 A * | 1/1991 | Leiber et al. | .......... | 180/197 |
| 5,939,846 A | 8/1999 | Young et al. | | |
| 6,564,139 B2 * | 5/2003 | Sakakiyama | .......... | 701/89 |
| 6,691,016 B1 * | 2/2004 | Sommer | .......... | 701/82 |
| 7,669,684 B2 * | 3/2010 | Rogg | .......... | 180/264 |
| 2007/0021875 A1 | 1/2007 | Naik et al. | | |

FOREIGN PATENT DOCUMENTS

| | | |
|---|---|---|
| DE | 4135691 | 4/1993 |
| DE | 4337356 | 5/1995 |
| DE | 4418539 | 11/1995 |
| DE | 19540067 | 4/1997 |
| DE | 19739276 | 3/1998 |
| DE | 10054368 | 5/2002 |
| DE | 102005039788 | 3/2006 |
| EP | 538967 | 4/1993 |
| EP | 798153 | 10/1997 |
| EP | 822129 | 2/1998 |
| EP | 1134142 | 9/2001 |
| EP | 1359032 | 11/2003 |
| EP | 1466772 | 10/2004 |
| WO | 92/04196 | 3/1992 |
| WO | 93/04888 | 3/1993 |

* cited by examiner

*Primary Examiner* — Tony H. Winner
(74) *Attorney, Agent, or Firm* — Dilworth & Barrese, LLP.

(57) ABSTRACT

A truck has improved control with a plurality of wheels each having a single wheel drive and a device for controlling speed and/or torque of the single wheel drives. The control device has a separate controller train for each wheel drive, with each controller train having a differential controller for correcting divided torque depending on steering angle and a wheel slip controller correcting the divided torque or torque value corrected by the differential controller depending on wheel slip and providing a corresponding single wheel drive torque value.

20 Claims, 18 Drawing Sheets

| $v = \omega r$ | $v < \omega r$ | | $v > \omega r$ | |
|---|---|---|---|---|
| Rolling wheel | Driven wheel | Spinning wheel | Braked wheel | Blocked wheel |
| $P = M$<br>Instantaneous pole $M$<br>Contact point $P$ | | | | |
| No slip | Drive slip | | Brake slip | |
| $s_A = 0$ | $s_A = \dfrac{v_P}{\omega r} = \dfrac{\omega r - v}{\omega r}$ | $s_A = 1$ | | |
| $s_B = 0$ | | | $s_B = \dfrac{v_P}{v} = \dfrac{v - \omega r}{v}$ | $s_B = 1$ |

Definition of the slip at the ridge wheel

FIG. 3

Lateral force and drift angle

TRUCK WITH IMPROVED CONTROL

BACKGROUND OF THE INVENTION

The present invention relates to a truck, in particular to a bulk goods dump truck of the so-called large dump truck type for the transport of mine overburden, raw materials and/or natural resources, having a chassis with wheels of which a plurality of wheels each have a single wheel drive and having a control device for the control of the speed and/or of the torque of the single wheel drives.

So-called large dump trucks such as are known from EP 1 359 032 A2 or from WO 92/04196 are primarily used in mining operations for the transport of the mined materials and ores. These bulk goods dump trucks are made in a size of several hundred metric tons unladen weight and working load so that special traction drives are required to control the corresponding enormous forces and drive conditions. In the large dump truck known from WO 92/04196, four wheels are combined in pairs at the rear axle and are mounted at two movably supported rocker arms at the vehicle frame. In this connection, a separate electric motor is associated with each of the wheels so that the wheels can also be driven individually at different speeds, in particular to prevent a grinding of the wheels during tight cornering. Optionally, a common single wheel drive can also be associated with a wheel pair so that, for example, two such single wheel drives are provided in the case of four wheels.

Such modern, diesel-electrically driven mining trucks must be able to transmit high traction forces with minimal wheel slip. Drive controls known from the automotive industry are not suitable here due to the special drive principle. When the large dump truck is operated in the ideal wheel slip range, this results in minimal tire wear and ideal driving stability since the transverse guidance properties of the tire are in the ideal range. It is required in this connection that a corresponding control is realized with a low sensor effort and works on different surfaces, also surfaces which change fast. A skid control which only limits the difference between driven wheels and non-driven wheels is therefore not sufficient or not possible.

Furthermore, with such large dump trucks, the braking process should take place solely controlled via the single wheel drives without the help of mechanical brakes. A mechanical braking system should only be used as a hand brake or emergency brake. Since such large dump trucks are, however, controlled via a torque set by the operator, braking to a standstill is not easily possible by the braking controlled by the single wheel drives since the single wheel drive braking torque is an active torque and not a reaction torque such as the friction torque of a mechanical brake. The driving torque of the single wheel drive must therefore be actively controlled to the load torque present when stationary. Older concepts make provision for this purpose for the torque limit of the brake torque to be limited to 0 Nm at a speed of zero. However, only a standstill on a straight surface is thus possible and influences of the mass acceleration are not taken into account so that a stop is only possible with the additional use of a mechanical brake and becomes very rough due to the non-considered environmental conditions.

SUMMARY OF THE INVENTION

Starting from this, it is the underlying object of the present invention to provide an improved truck of the named type which avoids disadvantages of the prior art and further develops the latter in an advantageous manner. In particular improved driving dynamics should be provided which effect an operation of the vehicle in the optimal wheel slip range without any great sensor system effort even on different surfaces and surfaces which change quickly and enables a gentle starting and stopping of the vehicle in a standstill and prevents any unwanted rolling backward.

This object is solved in accordance with the invention by a truck having the features herein. Preferred configurations of the invention are also the subject herein.

In order also to be able to operate the vehicle in the optimal wheel slip range under difficult ground conditions, provision is therefore made for the control device to have a separate controller train for each single wheel drive and to divide a desired torque set by the operator to the controller trains, with each controller train having a differential controller which corrects the divided desired torque in dependence on a steering angle and provides a correspondingly corrected desired torque as well as having a wheel slip controller which corrects the divided desired torque or the desired torque value corrected by the differential controller in dependence on a wheel slip and provides a corresponding single wheel drive desired torque value. A simple expansion to more than two drives is possible by the provision of separate controller trains. In this connection, the desired torque is first divided to the single drives by the operator, then corrected by the differential control and the wheel slip control and finally transmitted to a frequency inverter as a desired torque.

Provision is made in this connection in a further development of the invention for the wheel slip control to provide a speed control which determines a desired torque value with reference to the difference of an actual wheel speed and a desired wheel speed, with the named actual wheel speed in particular being the wheel speed of the driven wheel itself. An alignment with wheel speeds of non-driven wheels can be dispensed with.

The speed control can advantageously be effected by a PI controller to which the actual and desired wheel speeds are supplied as the input values.

The desired wheel speed is advantageously carried along with the actual wheel speed, with the reaction speed of the control being able to be increased by a corresponding sampling procedure. The desired wheel speed is here in particular determined in dependence on a desired acceleration value which mirrors a desired acceleration of the respective wheel and/or of the vehicle. The desired wheel speed can in particular be determined by integration of the named desired acceleration value over time.

To avoid a complicated sensor system, the acceleration adaptation stage can determine the actual vehicle acceleration from the difference of a plurality of actual wheel speeds stored at different times. In this connection, the difference in the stored wheel speeds is advantageously corrected in dependence on previously carried out desired acceleration value adaptations to achieve a greater security with respect to the vehicle acceleration determined from the wheel set acceleration.

To achieve a damping of vibrations in the powertrain, the wheel slip control advantageously includes a gradient limitation which limits the desired torque in dependence on the gradient of the time extent of the desired torque. A simple PI controller can hereby be used instead of an otherwise necessary PIDT1 controller. A DT1 monitoring can be dispensed with.

The wheel slip control advantageously works independently of speed signals of non-driven wheels so that corresponding additional speed sensors can be omitted. The wheel slip control can in particular work only in dependence on speed signals of the driven wheels to be controlled.

In addition, the wheel slip controller can advantageously work independently of information on the current vehicle weight and independently of information on the current road gradient.

Provision is made with respect to the differential control in an advantageous further development of the invention for the desired torque correspondingly corrected hereby to be determined by means of a speed controller in dependence on a difference of the actual wheel speed and a desired wheel speed. The speed controller can advantageously be a simple P controller, with the P factor of the speed controller being able to be coupled proportionally to the desired torque value in accordance with a preferred embodiment of the invention.

The desired wheel speed is advantageously determined in dependence on the current wheel speeds of a plurality of wheels, on the chassis geometry and on the steering angle, with the chassis geometry in particular being able to be preset by the track width of the chassis and the axial distance.

To be able to determine the desired wheel speeds with reference to the current wheel speeds of a plurality of wheels, the corresponding desired speed sensor can transform the current wheel speeds in each case at a point between the corresponding wheels, can average the wheel speeds thus transformed and can determine the desired speeds of the respective wheels from this.

In a further development of the invention, the differential control includes a ramp stage by means of which an acceleration ramp for the change of the desired wheel speed is taken into account in the determination of this desired wheel speed.

In accordance with a further aspect of the present invention, the driving dynamic control includes a stop control which brings the vehicle to a stop on the presence of a stop signal set by the driver, for example by pressing a brake pedal and/or maintains it at the stop, with the stop control being based on a speed control which provides a corresponding desired torque with which the respective single wheel drive is controlled in dependence on the difference of the actual wheel speed and the desired wheel speed which amounts to zero in this case.

The speed controller can in particular be a precontrolled PI controller in this connection.

In order also to permit the speed control in a simple manner in the vicinity of the standstill without having to use any special complicated encoders unsuitable for use in large dump trucks, a special encoder evaluation is provided in a particularly advantageous further development of the invention. A simple multi-track encoder for the detection of the actual wheel speed or engine speed or transmission speed can be used, with the signal evaluation advantageously being carried out in the form of a flank-dependent simple evaluation of the signals of the plurality of encoder tracks performed in parallel. A new speed value can be computed just as frequently as with a customary fourfold evaluation by such flank-dependent simple evaluations which are made in parallel, but without the restrictions having to be made in the sampling ratio of the track signals which accompany a fourfold evaluation. An improved quality of the control can in particular be achieved at low speeds and thus few pulses per time unit. Simple magnetic encoders can hereby also be used in which speed-dependent differences of the sampling ratio occur which would result in a distorted signal with the usual fourfold sampling.

The named improved encoder evaluation can also advantageously be used for a speed control which prevents an unwanted rolling backward of the vehicle. For this purpose, in particular a change-over speed controller can be used which can be designed as a PI controller and controls the speed to zero when an unwanted backward rolling occurs.

BRIEF DESCRIPTION OF THE DRAWINGS

The invention will be explained in more detail in the following with reference to preferred embodiments and to associated drawings. There are shown in the drawings:

FIG. 3: an overview of the slip states at a wheel;

DESCRIPTION OF THE PREFERRED EMBODIMENTS

Figure 21:
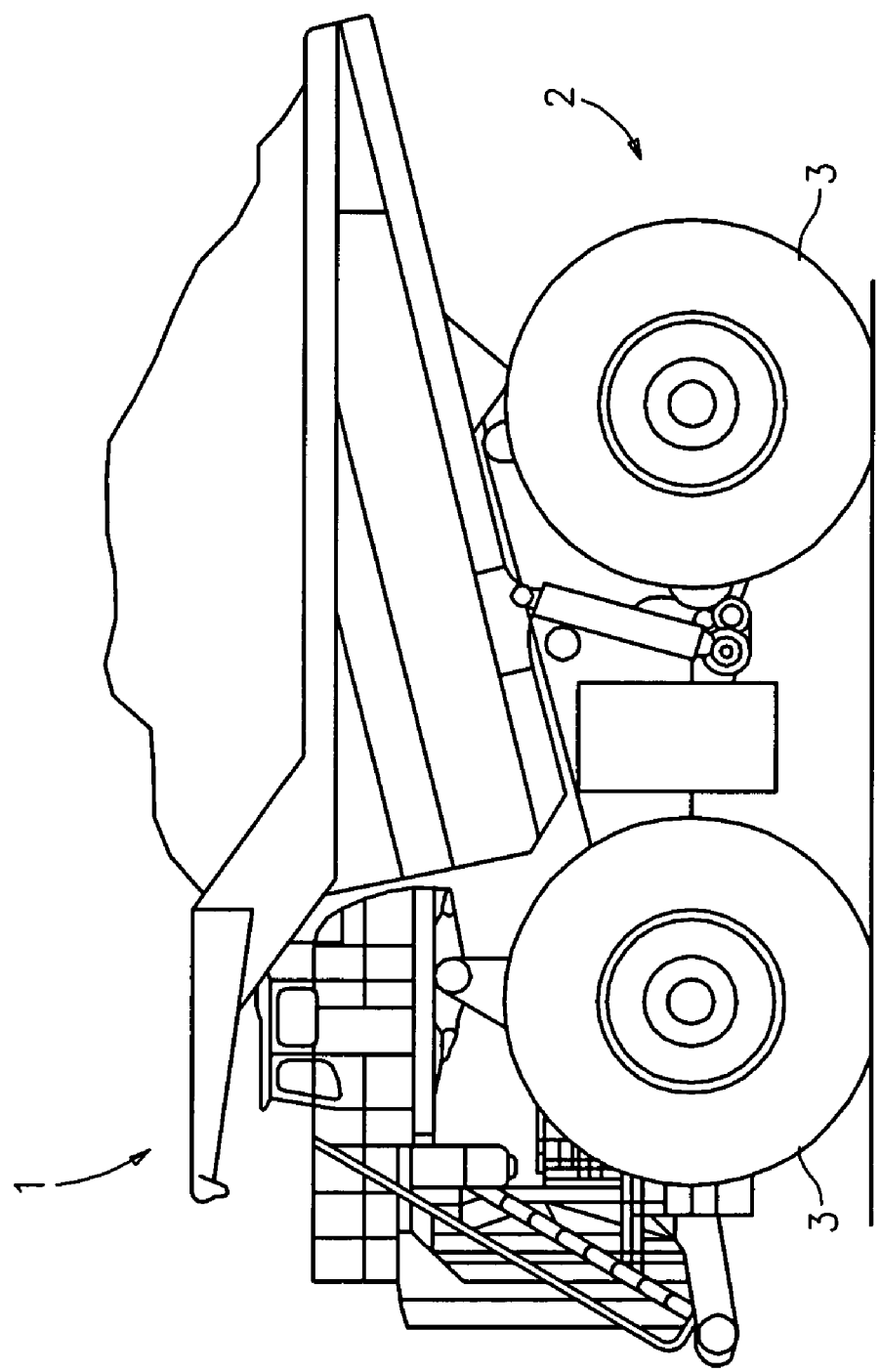
FIG. 21: a side view of the large dump truck in accordance with an advantageous embodiment of the invention.
Figure 22:
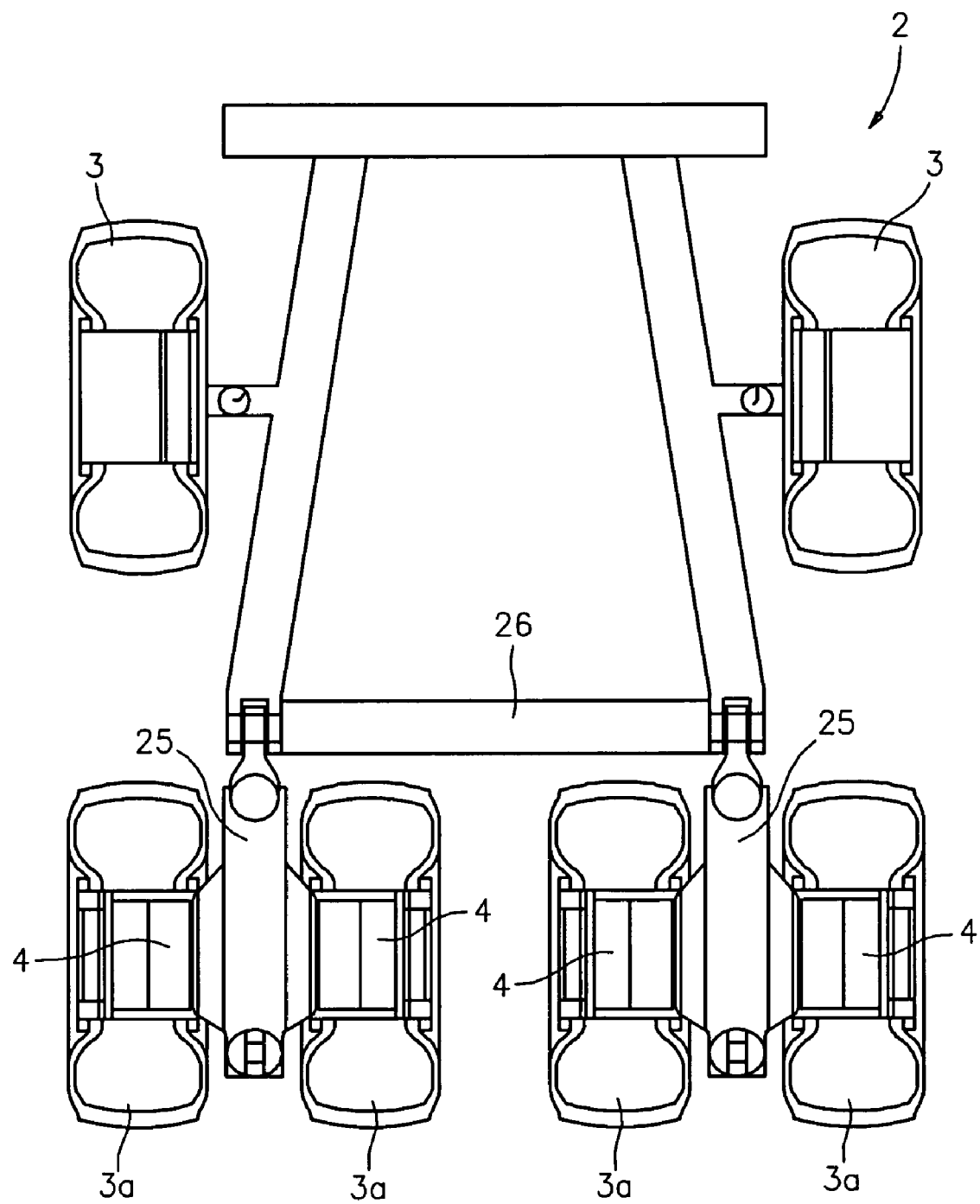
FIG. 22: a schematic plan view of the chassis of the large dump truck of FIG. 21.

FIG. 21 schematically shows a large dump truck in accordance with an advantageous embodiment of the present invention which has a chassis 2 with wheels 3 which are driven by single wheel drives 4. In this connection, as FIG. 22 shows, the rear wheels 3a can be suspended, combined in pairs, at a respective rocker arm 25 which is pivotally connected to the vehicle frame 26 pivotable around respective lying transverse axes. An electric single wheel drive 4 is associated with each pair of wheels 3a, with no mechanical differential being provided between the wheel pairs of the rear wheel axle. Although a rear axle arrangement with two wheel pairs and thus two powertrains is shown in FIG. 22, it is understood that other configurations are also generally possible, for example, the four-wheel rear axle arrangement shown in FIG. 22 with single wheel drives associated with each wheel, that is a total of four single wheel drives, or rear axle arrangements having more than four wheels and a corresponding different number of single wheel drives.

As FIG. 21 shows, the chassis 2 supports in a manner known per se a dump body which can be loaded with overburden or other bulk material and which can be tilted around a lying transverse axis for the purpose of unloading. In the drawn embodiment, a driving cab, from which the large dump truck 1 is controlled, is arranged above the front axle below the upper front edge of the dump body.

Figure 1:
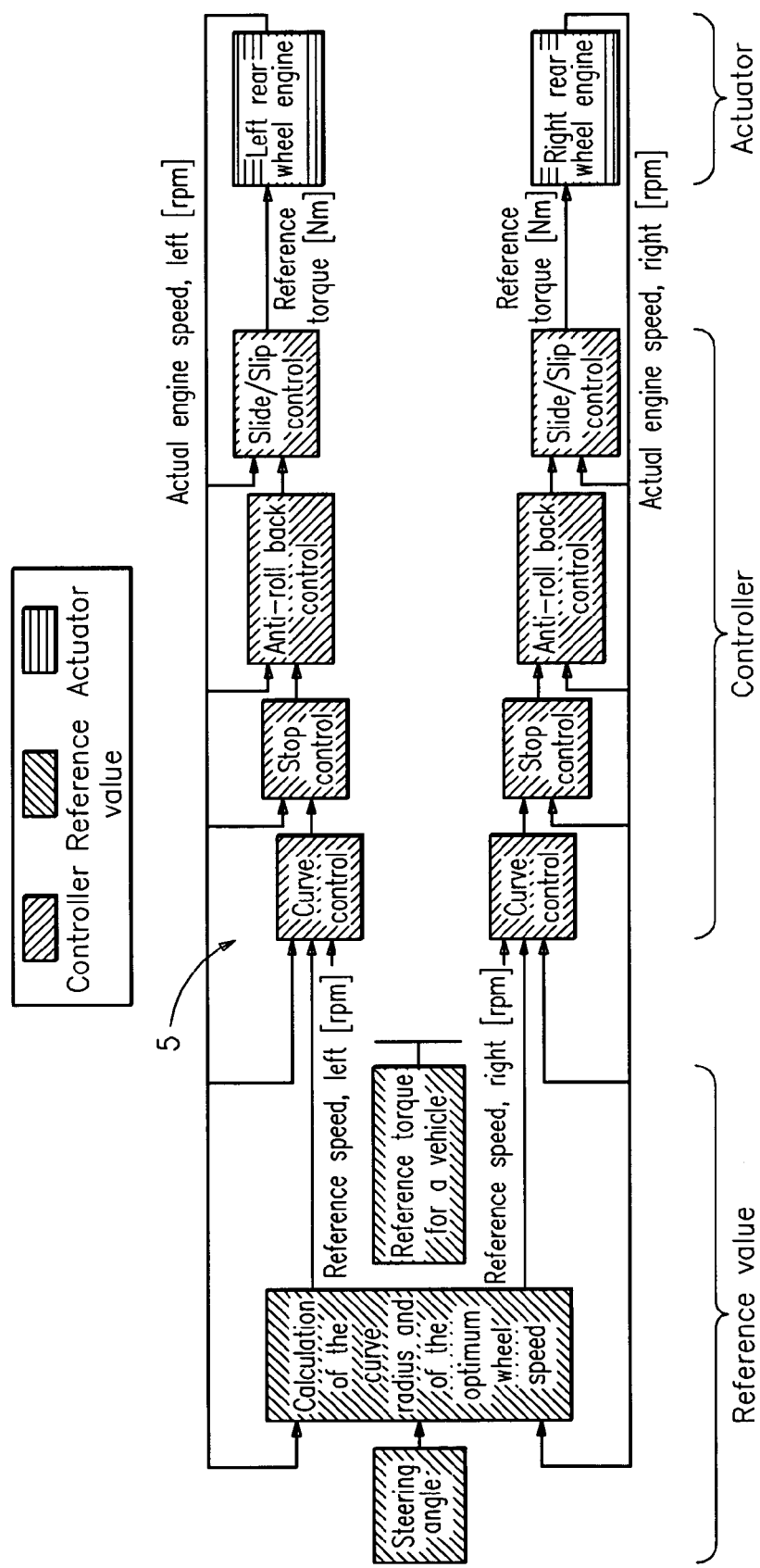
FIG. 1: a schematic overview of the vehicle dynamic control for a large dump truck in accordance with a preferred embodiment of the present invention.

To achieve a corresponding handling of the mining truck, a plurality of driver assistance systems are provided, as shown in FIG. 1, which will be explained in detail in the following.

Mining trucks or large dump trucks are driven by two or more single drives which are not mechanically coupled, e.g. by a differential transmission. This makes it necessary to implement a differential control which guides the wheel speeds of the individual drives with respect to one another in dependence on the steering angle. In addition, a yaw moment corresponding to the steering angle can be generated by the differential control which supports cornering and thus substantially improves the driving properties of the truck since a pushing over the front wheels is minimized. In addition, the spinning or blocking of single wheels is suppressed by the differential control and thus additionally acts as a second wheel slip control.

Figure 2:
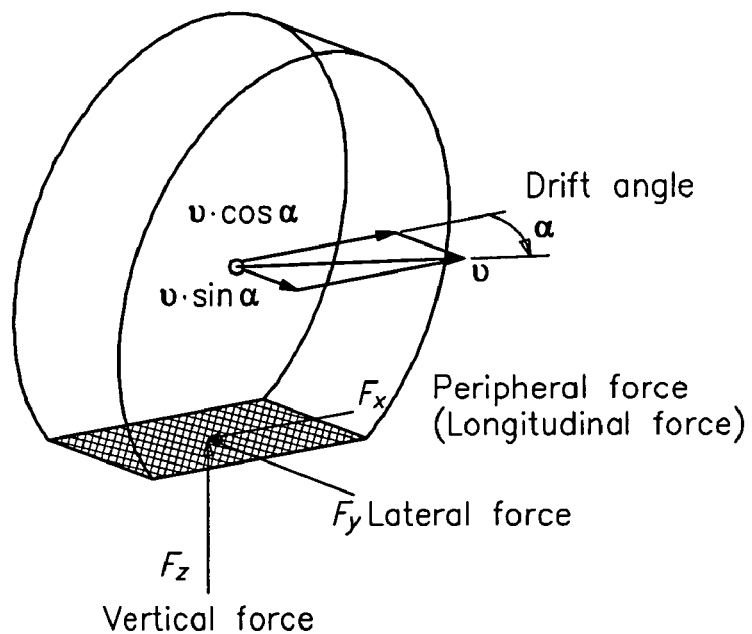
FIG. 2: a schematic representation of the forces acting at the wheel contact surface of a wheel.

The transmission of the forces between the tires and the road takes place at the wheel contact surface (shuffle) which is formed under the wheel load in the contact region with the road. The resulting contact force is broken down into three components, as FIG. 2 shows, namely in the vertical direction (perpendicular to the road: vertical force Fz), in the longitudinal direction peripheral direction: longitudinal force (longitudinal force, tangential force) Fx) as well as in the transverse direction (lateral direction: side force (lateral force) Fy).

A unilateral binding is present in the vertical direction. The horizontal force components (parallel to the road; longitudinally and transversely) are in contrast transmitted by friction in a substantially force transmitting manner and are therefore generally limited.

For the transmission of longitudinal forces in the shuffle, two actions are decisive, namely the force transmission, on the one hand, i.e. the adhesion in the shuffle surface and, on the other hand, the shape matching, i.e. the meshing between the tire and the road surface.

The ratio between the longitudinal force Fx and normal force Fz is defined as the force transmission coefficient in the peripheral direction:

$$\mu = \frac{F_x}{F_z}$$

The arising of longitudinal forces can be described by shear deformations of the tread in conjunction with the friction behavior between the tread and the road. The kinematics of the shear deformations is detected by the peripheral slip.

On the smooth movement of a rigid wheel, the two movement states of pure rolling (kinematic rolling, rolling without sliding) and combined rolling and sliding (sliding/rolling) are distinguished (wheel radius r, speed of the wheel center v, speed of the wheel contact point vP, angular speed ω). The (dimensionless) peripheral slip is defined as the movement state. In this connection, FIG. 3 shows the different slip states. A distinction is made between the driving slip sA and the braking slip sB, in that the amount of vP is related to the respectively larger value of v or ωr.

Driving Slip at the Driven Wheel (v<ωr):

$$s_A = \frac{v\rho}{\omega r} = \frac{\omega r - v}{\omega r}$$

Braking Slip at the Braked Wheel (v>ωr):

$$s_B = \frac{v\rho}{v} = \frac{v - \omega r}{v}$$

The slip is also frequently given in percent; e.g. sA=0.9 corresponds to sA=90%.

Figure 4:
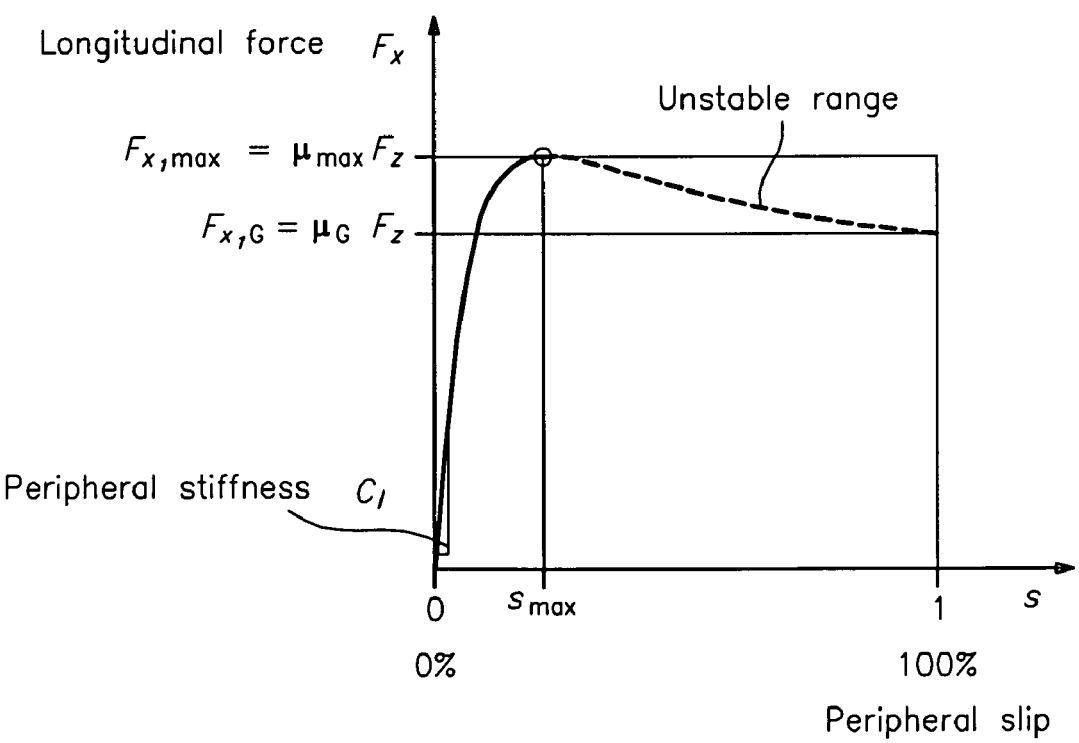
FIG. 4: a representation of the functional relationship between the longitudinal force transmitted by a wheel and of the peripheral slip with reference to a typical slip curve.

The transmitted longitudinal force Fx can be shown in dependence on the peripheral slip s (braking slip or driving slip), cf. FIG. 4.

The typical extent of this slip curve is produced as follows:

With a small s, the adhesion region extends over almost the total shuffle length. The longitudinal force Fx first rises in accordance with the surface remaining almost triangular under τx(x) in an almost linear manner, that is Fx=$c_l$*s. The proportionality constant $c_l$ is termed the peripheral stiffness of the tire.

With a further increasing s, the sliding range increases overproportionally and the transmitted longitudinal force Fx(s) exceeds a maximum Fx;max. The maximum defines the maximum force transmission coefficient μmax=Fx;max/Fz.

The maximum force transmission coefficient μmax does not coincide with the adhesion coefficient μH of the friction pairing rubber/road, but is much lower. This is due to the fact that the limit value of the adhesion friction is only reached in the transition region between the adhesion zone and the sliding zone in the shuffle. The limit value Fx;max=μH Fz which appears plausible at first glance cannot be realized with a rolling wheel due to the described setup of the peripheral strains in the shuffle.

With a large slip s, the transmitted longitudinal force Fx fall to the value FxG for pure sliding (spinning wheel; with a locked wheel on braking). The force transmission coefficient then corresponds to the sliding friction coefficient μG=F×G/Fz.

Figure 5:
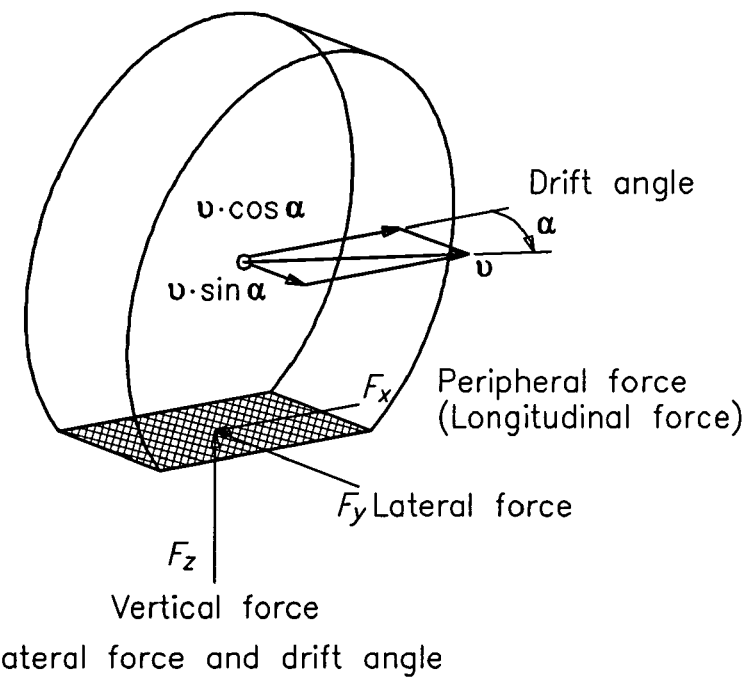
FIG. 5: a schematic representation of the relationship of the side force acting at the contact surface of a wheel and of the associated drift angle.

If a freely rolling wheel (no longitudinal force, Fx=0) is additionally subjected to a side force Fy, a lateral speed component is adopted. The drift angle α is adopted between the movement direction of the wheel center (speed v) and the intersection lines of the wheel plane and the road plane, as FIG. 5 shows, with the relationship:

$$\sin \alpha = v_y/v$$

applying.

The value sin α is the transverse slip or drift. For small drift angles (in normal operation α<10±), the drift angle and the drift (transverse slip) can be said to be equal, with:

$$\sin \alpha = \alpha$$

applying.

A rolling wheel is only able to transmit a lateral force Fy when it rolls obliquely to the direction of travel.

Figure 6:
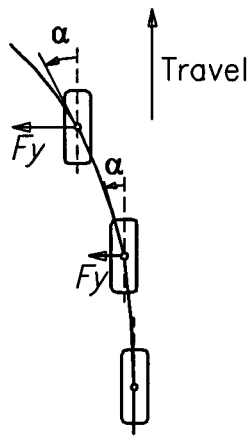
FIG. 6: a schematic representation for the illustration of the relationship between the drift angle and the magnitude of the side force.
Figure 6:
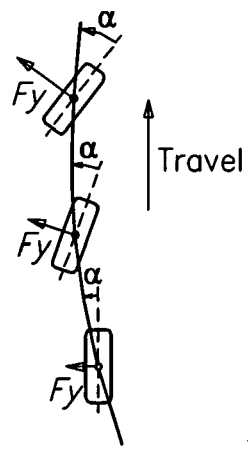

As FIG. 6 shows, the larger the lateral force Fy, the larger the drift angle α x adopted.

If a wheel should follow a wanted desired course, it must be "set" with a drift angle α with respect to the trajectory tangent as the lateral forces increase, cf. FIG. 6.

In general driving states, the tire simultaneously transmits a longitudinal force Fx and a lateral force Fy. The resulting force of Fx and Fy cannot exceed a specific limit value in similar way to the Coulomb friction cone. If the maximal force transmission strains μmax coincide in the peripheral direction and lateral direction, this limit value is reproduced by Kamm's circle.

$$\sqrt{F_x^2 + F_y^2} \leq \mu_{max} \cdot F_z$$

The maximum transmissible lateral force Fy is in this connection smaller with a simultaneous occurrence of a longitudinal force F than at Fx=0.

If a longitudinal force Fx additional acts on a tire with a given lateral force Fy, the drift angle α and the longitudinal slip s increase.

Figure 7:
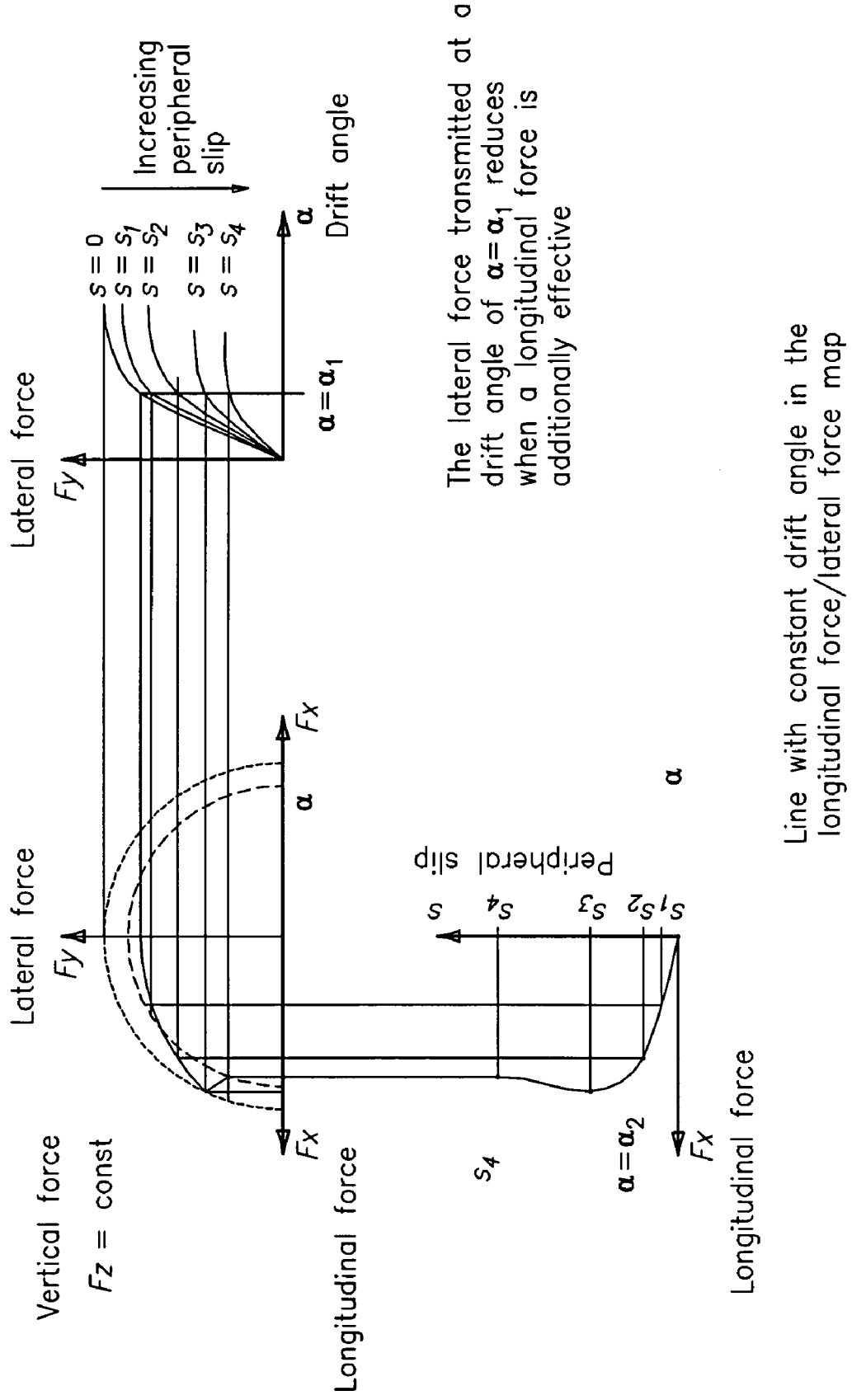
FIG. 7: a brim diagram for the illustration of the influence of the peripheral force on the side force transmission.

The influence of the longitudinal force on the lateral force transmission is usually shown in a lateral force/longitudinal force map or a so-called brim diagram, cf. FIG. 7. The lines of constant drift angles α are of particular interest: If the longitudinal force Fx increases, the lateral force Fy must become smaller if the drift angle α is to remain constant. The line α=const is tangent to Kamm's circle of maximum transmissible horizontal force and ends on the smaller circle of maximum transferable slide friction force.

Figure 8:
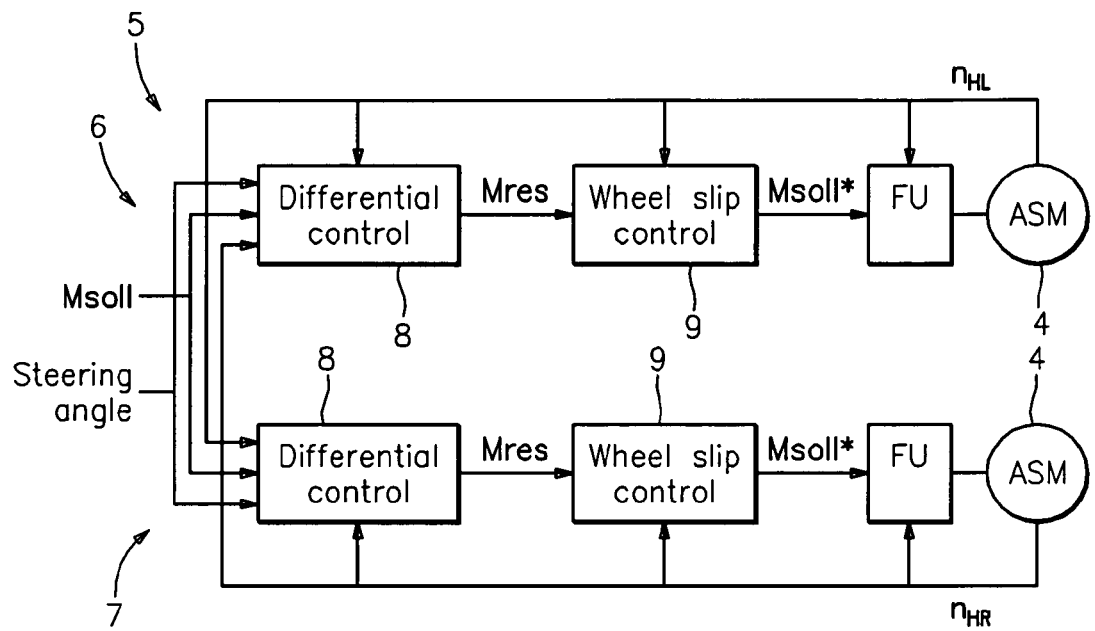
FIG. 8: a schematic overview representation of the combined differential and wheel slip control in accordance with a preferred embodiment of the invention.

The concept of the control provides, as FIG. 8 shows, a separate controller train for each drive; this enables a simple extension to more than two drives. The desired torque from the operator (Msoll) is first distributed to the individual drive, then corrected by the differential control and the wheel slip control and subsequently forwarded to the frequency inverter as the desired torque (Msoll*).

A typical traction force characteristic intersects the abscissa when the peripheral tire speed v* is equal to the vehicle speed v. The speed v is a function of the vehicle acceleration so that the traction force characteristic moves in dependence on this acceleration in the selected coordinate system.

v* results from:

$$v^* = \frac{2 \cdot \pi \cdot r_R}{\ddot{u}} \cdot n^*$$

where
$r_R$=tire radius
$\ddot{u}$=gear ratio

The movement of the drive characteristic is thus dependent on the desired acceleration value a*. If this is larger than the vehicle acceleration, the drive characteristic migrates faster than the traction force characteristic. The point of intersection of the two characteristics characterizing the quasi-stationary operating point is thus likewise transposed in the direction of larger difference speeds. In contract, its position remains unchanged for a*=a, whereas is migrates to the left for a*<a.

Figure 9:
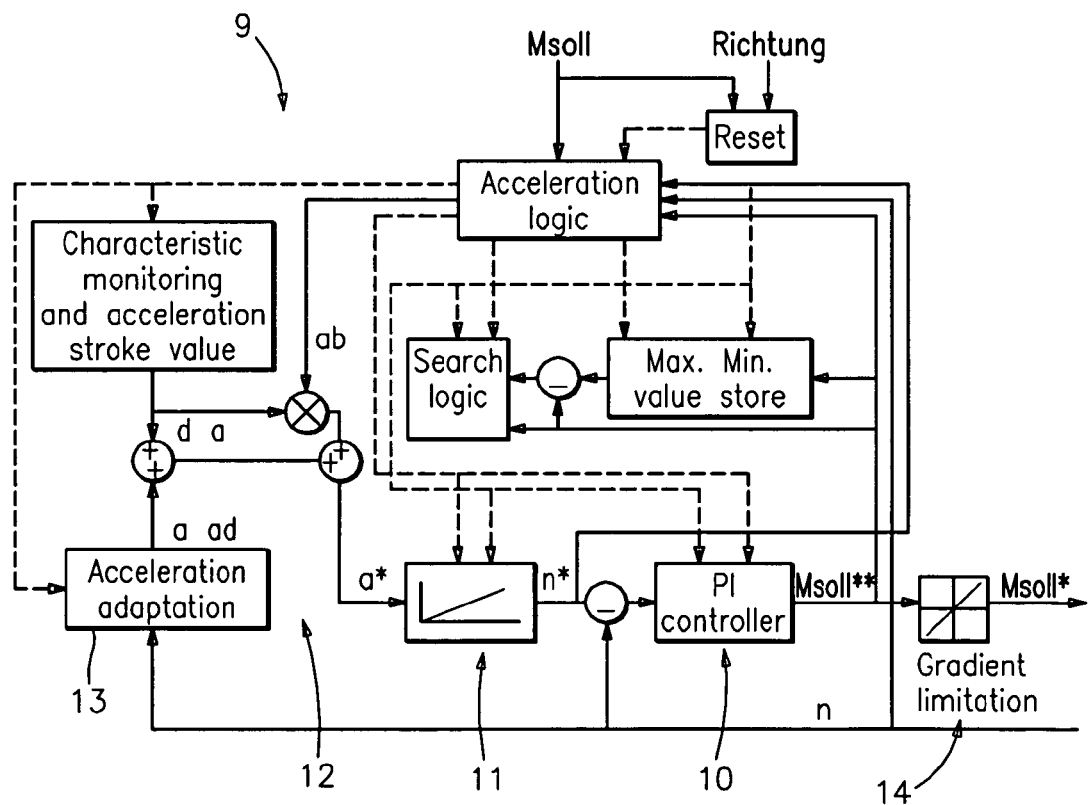
FIG. 9: an overview of the controller structure of the wheel slip control in accordance with an advantageous embodiment of the invention.

The speed controller included in the wheel slip control, cf. FIG. 9, is given its guide parameter n* by integration of the acceleration value a*.

By setting the desired acceleration value a* (a*<a, a*=a, a*>a), the wheel slip control can thus be set to any desired operating point on the traction force characteristic. It is now the task of the search logic to place the operating point at the maximum of the current traction force characteristic.

The PI controller, cf. FIG. 9, calculates the desired torque value Msoll*, which may not exceed the preset value Msoli, in dependence on the control deviation (n*−n).

The control also operations passively, i.e. in the drive case, the parameter Msoll* is limited to a minimum of 0 Nm; that is, there is no active braking intervention for a spinning wheel and no driving torque is generated in the braking case.

The control in particular works in 2-quadrant operation and therefore requires a direction signal for a reverse trip.

The wheel slip control is reset when the direction signal has no direction or changes its sign, the amount of Msoll becomes smaller than Mgrenz (constant), the mechanical brake is closed, a negative speed is applied or the wheel slip control has been switched off manually. In the case of a reset, Msoll=Msoll* and the control is reinitialized. Mgrenz is to be selected such that no skidding of the wheels can occur at smaller torques and thus slip control is no longer necessary. This additionally also has the result that the control is reinitialized on a change from driving to braking or vice versa.

Figure 10:
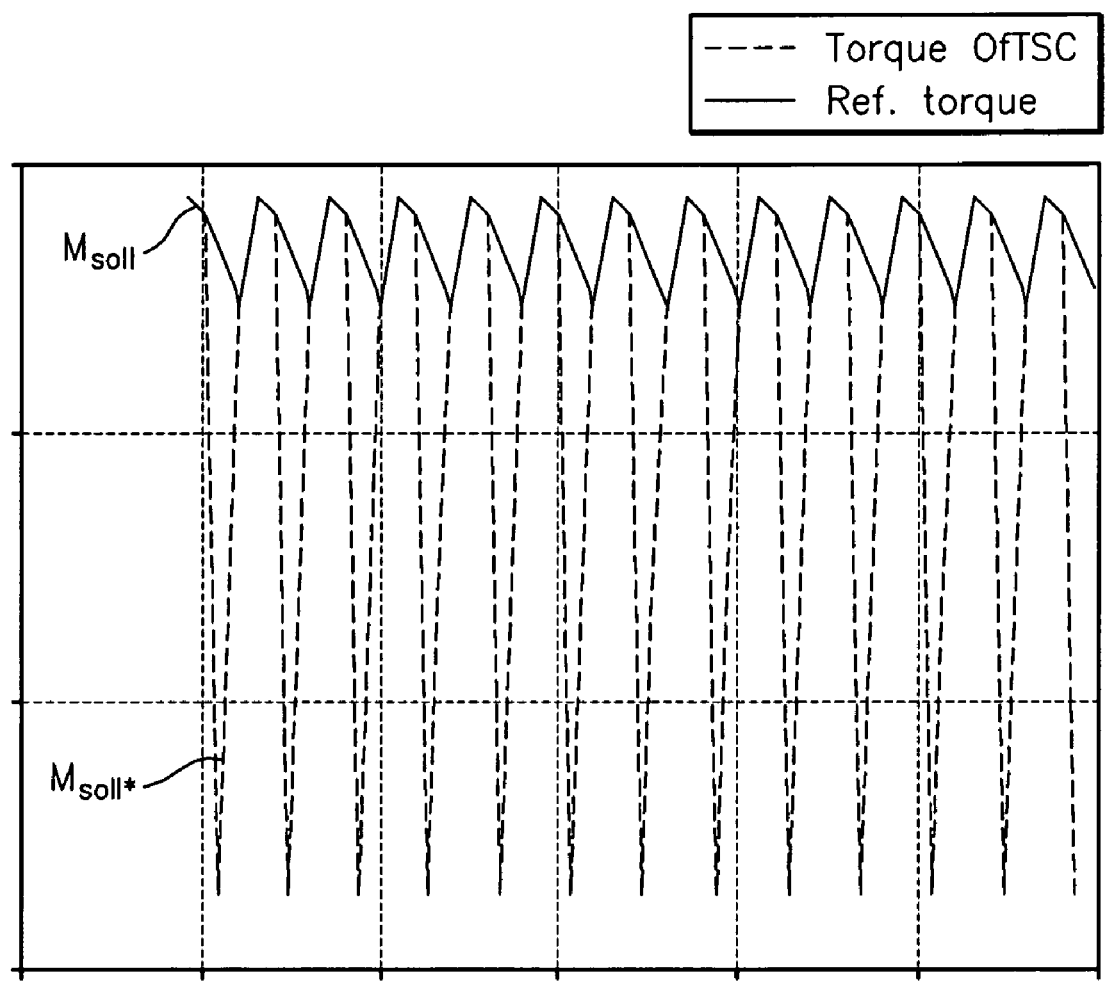
FIG. 10: a representation of the extent of the desired torque $M_{Soll}$ and of the corrected desired torque value $M_{Soll*}$ in limiting operation.
Figure 11:
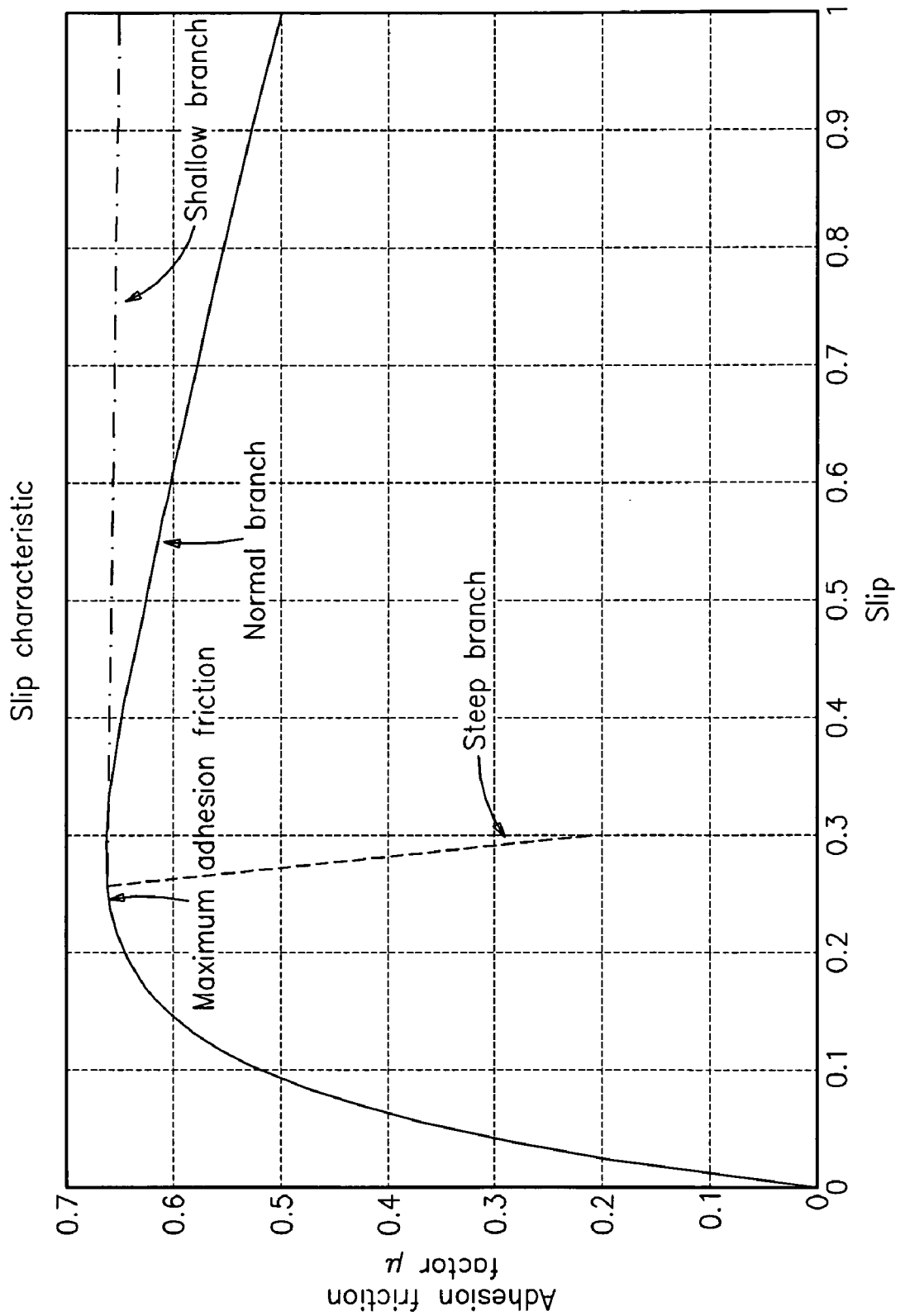
FIG. 11: a schematic representation of different traction force characteristics with a steeply falling branch, a normally falling branch and a shallow-falling branch.

The wheel slip control always attempts to operate the drive at the optimum operating point of the traction force characteristic. In the control case, however, an operating point below the optimum results since the desired torque value Msoll is smaller than the maximum transmissible torque because either torque is no longer set by the operator or because torque can no longer be produced due to the limited power of the drive motors. It must therefore be possible to limit the torque Msoll* to Msoll for a wheel slip control suitable for operation. A simple limitation of the output value Msoll* would, however, have the result that the search logic would no longer be able to recognize a slipping wheel. The integrator and the speed controller are therefore manipulated by the limitation logic such that Msoll* does not exceed Msoll. The manipulation of the integrator has the result that Msoll* varies slightly around the value Msoll, as FIG. 10 shows in detail by way of example. This variation of the torque results in a permanent sampling procedure of the ground which enables the search logic to recognize any exceeding of the optimum operating point. So that the limiting logic can recognize any exceeding of Msoll* above Msoll, the non-manipulated value of the speed controller is taken as a comparison. The influences of the limitation logic on the individual parts of the control are described in the respective chapter.

As already described, the drive characteristic is displaced by the acceleration value a*. a* is formed from:

$$a^* = a\_ad + d\_a$$

where a_ad is the adapted acceleration and should approximately correspond to the real vehicle acceleration and d_a is the acceleration variation value.

To obtain a functioning control, the condition:

$$|a\_ad - a| = |d\_a| \text{ must be satisfied.}$$

The acceleration variation value d_a is composed of:

$$d\_a = (d\_aK + (a\_ad * P\_ad) + a\_Init) * a\_red$$

where:
d_aK is a fixed acceleration stroke constant. The more precisely a_ad coincides with a, the smaller the d_aK value can be selected, which results in a finer correction of slip values which are too large. In principle, the d_ak must, however, be selected to be so large that it can compensate possible errors of a_ad.

An increase of d_a is effected by a_ad*P_ad in order still to satisfy the condition |a−ad−a|=|d_a| at high accelerations.

a_Init is an additional acceleration and can adopt the values 0 and a_InitK. When starting from a stationary position, there is not yet any value for a_ad and n* is still at zero. To be able to build up a torque from the stationary position quickly, a_Init is set to a_Initk to build up an n* value larger than zero as quickly as possible so that a control difference is formed sufficiently fast for the speed controller to be able to follow the Msoll value. In the same way, a_Init is set to a_Initk when the control is reset or when Msoll changes sign. a_Init is reset to 0 as soon as an a_ad value larger than 0 is present or the time limit T_a_Init_On is exceeded. a_Initk must be larger than any possible acceleration of the vehicle.

a_red is activated by the characteristic monitoring and can adopt the values 1 and a_redK.

The search logic has the two states a0 and a1 and thus varies the d_a value. In the a1 state, d_a=d_a; in the a0 state, d_a =−d_a.

It is thus possible for the search logic to transpose the drive characteristic into the optimum operating point.

Figure 12:
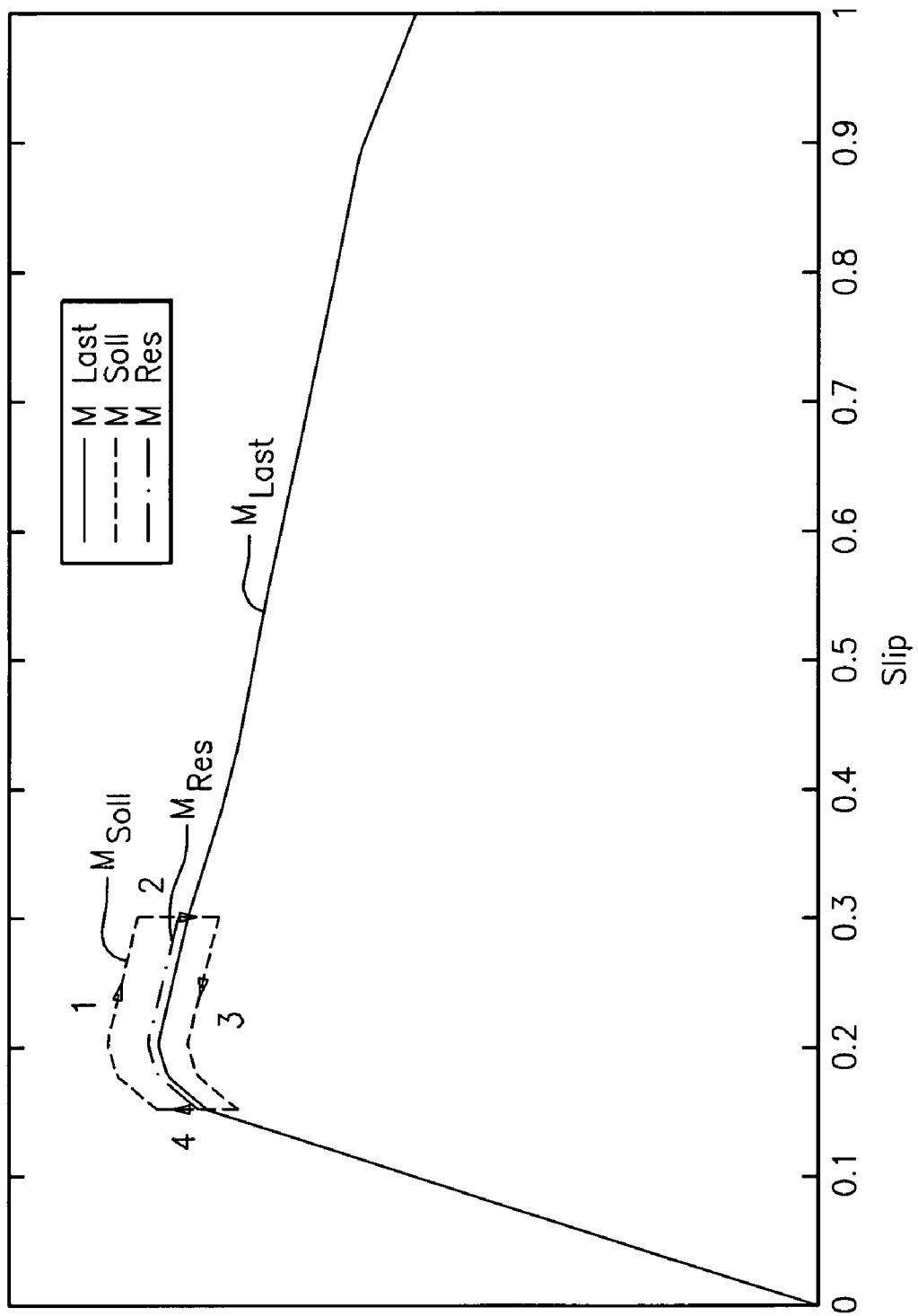
FIG. 12: a representation of the torque extent in dependence on the slip.

An additional reduction of d-a during an a0 phase is necessary with force transmission ratios which are characterized by two characteristics, namely traction force characteristics with a steeply falling branch, on the one hand, and with a branch falling in a shallow manner, on the other hand, as is shown in FIG. 12, with the traction force characteristic with a steeply falling branch being shown as a dashed line and the traction force characteristic with a branch falling in a shallow manner being shown is a chain dotted line.

The additional information required for the distinguishing of the characteristics can be determined from the wheel acceleration. This can be calculated approximately from the engine speed n.

$$a\_R \approx \frac{2 \cdot \pi \cdot r_R}{ii} \cdot \frac{dn}{dt}$$

The acceleration a_R is stored on the switching from an a1 phase to an a0 phase for the recognition of characteristics with a steeply falling branch. The difference is subsequently calculated between the stored wheel acceleration and the current wheel acceleration.

$$a\_R\_diff = a\_R - a\_R\_Gespeichert$$

If a_R_diff exceeds the limit value a_RGrenz during an a0 phase, a_red is set to a_redK and d_a is thus additionally reduced. This is necessary because the reduction of the acceleration a* during the a0 phase has not resulted in a reduced wheel acceleration.

The search logic searches for the maximum of the force transmission. Since there is no clear maximum with characteristics with a shallow branch, an additional monitoring is necessary since otherwise the operating point can drift to large difference speeds without being noticed. If the control is in search operation and if the wheel acceleration a_R is larger during an a1 phase than the adapted acceleration a_ad times the a_Fb factor, a time counter is started which forces a switch to the a0 phase after the end of the time Ta1 and simultaneously sets a_red to a_redK even though no torque maximum has yet been discovered by the search logic.

The wheel slip control can only move the operating point on the traction force characteristic in the desired direction if the acceleration a* is smaller during the a0 phase and is larger than a during the a1 phase. Since the d_a value remains approximately constant, it is necessary to adapt this value to the vehicle acceleration a. This is the task of the acceleration adaptation stage which maps the unknown vehicle acceleration.

As long as the difference of V*−V remains approximately constant, the mean wheel acceleration is equal to the vehicle acceleration. With a wheel slip controlled drive, the vehicle acceleration can thus be determined from the wheel set acceleration. For this purpose, the acceleration adaptation stage in each case stores the engine speed when a switch is made from an a0 phase to an a1 phase. Since an a0 phase was previously applied, i.e. the wheel acceleration has been reduced, it can be assumed that the difference speed was minimal at this time.

The mean wheel set acceleration can then be determined as the adapted vehicle acceleration a_ad from the difference of two stored speeds and the associated measuring times t1 and t2.

a_ad at the time t2 then results as:

$$a\_ad(t2) = \frac{2 \cdot \pi \cdot r_R}{ii} \cdot \frac{n(t2) - n(t1)}{t2 - t1}$$

To obtain greater security of the value a_ad, a_ad is formed from the mean value of the last two adaptations.

$$a\_ad = \frac{a\_ad(t2) + a\_ad(t1)}{2}$$

This value is additionally limited to plausible values. There is thus a constant minimum which is defined by a_ad and a variable maximum a_ad_Max_Var.

a_ad_Max_Var is determined from the linear mean value of the traction force engaging at the vehicle. There then results with the general formula for mass acceleration:

$$a = \frac{F}{m}: \text{a\_ad\_Max\_Var} = \frac{1}{m\_mittel} \cdot \frac{1}{t2-t1} \cdot \int_{t1}^{t2} F\_Zug \cdot dt$$

The half loaded vehicle mass is used for m_mittel. This equation no longer applies in the case of empty trips, fully loaded trips, trips uphill and trips downhill, but the error in the calculation is compensated by the d_a value; this limitation can thus be applied in all trip situations without making use of additional information such as current vehicle weight and current road gradient.

Since the a_d value should only reproduce the tendency of the vehicle acceleration, the time between two adaptations should amount to several hundredths of a second. Since the change between a0 and a1 phases can also take place faster, it is also necessary to be able to block the adaptation. In limitation operation, in which there are no a0 phases, it must moreover also be possible to trigger an adaptation. The further conditions are listed in the following:

In limitation operation, an adaptation is triggered after a constant interval T_zB:

A blocking of the adaptation for the period t_Adap takes place after every adaptation.

If a_Init is set to 0 from a_InitK, an adaptation takes place.

An adaptation is triggered after each reset.

It is the job of the integrator to calculate a desired speed from the acceleration formed.

The acceleration value is calculated as:

$$a^* = d\_a + a\_ad + (d\_a \cdot ab)$$

where the value ab is controlled by the limitation logic and can adopt the values 0 or −2.

An a1 phase is applied permanently during the limitation operation and d_a is thus always +d_a. The limitation logic has the possibility of maintaining n* and n at the same value due to the ab value. Since only small difference speeds are present in limitation operation, this condition is met. The factor ab is set to −2 if n* is larger than n and to 0 if n* is smaller than n. An artificial a0 phase is thus established in principle which results at an ad value of −2:

$$d\_a + -2d\_a = -d\_a$$

n* thus fluctuates permanently around n by the variation of the ab value, which results in the already described sampling procedure.

During the search operation, the ab value remains at 0 and thus has no influence on the acceleration. The variation of the acceleration then takes place only by the change from a0 and a1 phases in which the d_a value then changes between −d_a and +d_a.

To avoid too large a drifting of the n* value from n, n* can never be larger than n+n_Distance, where n_Distance is a fixed constant.

n* is initialized to n during a reset.

The PI controller calculates the value Msoll** from the difference of n*−n. In limitation operation, the I portion of the controller is manipulated so that Msoll** results as Msoll.

The output of the wheel slip control, Msoll* is the limited value of Msoll**.

It applies to Msoll>0:

$$Msoll^* = Msoll^{**} \Big|_{-Msoll}^{0}$$

It applies to Msoll<0:

$$Msoll^* = Msoll^{**} \Big|_{0}^{Msoll}$$

To prevent an overflow of the value Msoll and to nevertheless give the search logic sufficient play, a specific overflow is allowed for the value Msoll which is defined by Mabove. It follows from this:

It applies to Msoll>0:

$$Msoll^{} = Msoll^{} \Big|_{0-MAbove}^{Msoll+MAbove}$$

It applies to Msoll<0:

$$Msoll^{} = Msoll^{} \Big|_{-Msoll-MAbove}^{0+MAbove}$$

The value Msoll** is used internally in the control for the Max-min value store and the search logic.

The torque extent of Msoll** is permanently monitored by a minimal value and a maximum value store. The stored values are monitored by the search logic and the stores can be reinitialized by the search logic and the limitation logic.

The longitudinal force Fx substantially forms the load torque and the load torque is therefore also dependent on the slip. Since the wheel slip control works in a speed controlled manner, the load torque is reflected in the desired torque value Msoll. The desired torque value Msoll therefore reduces on exceeding of the optimum operating point, as can be seen in FIG. 12 as phase 1. If the wheel acceleration is then reduced, the operating point again migrates back to smaller slip values (phase 3), which in turn results in an increase in the load torque and thus in an increase of Msoll**. Phases 2 and 4 represent compensation procedures after the change of the acceleration direction, cf. FIG. 12.

These minima and maxima in the desired torque value Msoll** are recorded by the Min and Max value stores and are evaluated via the search logic.

The manner of working will now be explained with reference to a simulated retard (electric braking) procedure, as is shown in detail by way of example in FIG. 13.

At the time t=180.2, an a1 phase starts and the operating point is displaced toward larger slip values (phase 1). The optimum operating point is exceeded at t=181.3. The max value store has discovered a maximum and pMax has exceeded the pMaxSch threshold. The maximum percentage value pMax is defined as follows:

$$p\text{Max} = \frac{Msoll^{} - \text{MaxValue}}{Msoll^{}}$$

The threshold to recognize a maximum was selected by percentage to take account of the high torque range of the drive engines. At a constant difference torque, the maximum would be recognized too late at low desired torques and vibrations in the powertrain would be misinterpreted as a maximum at high desired torques.

Figure 13:
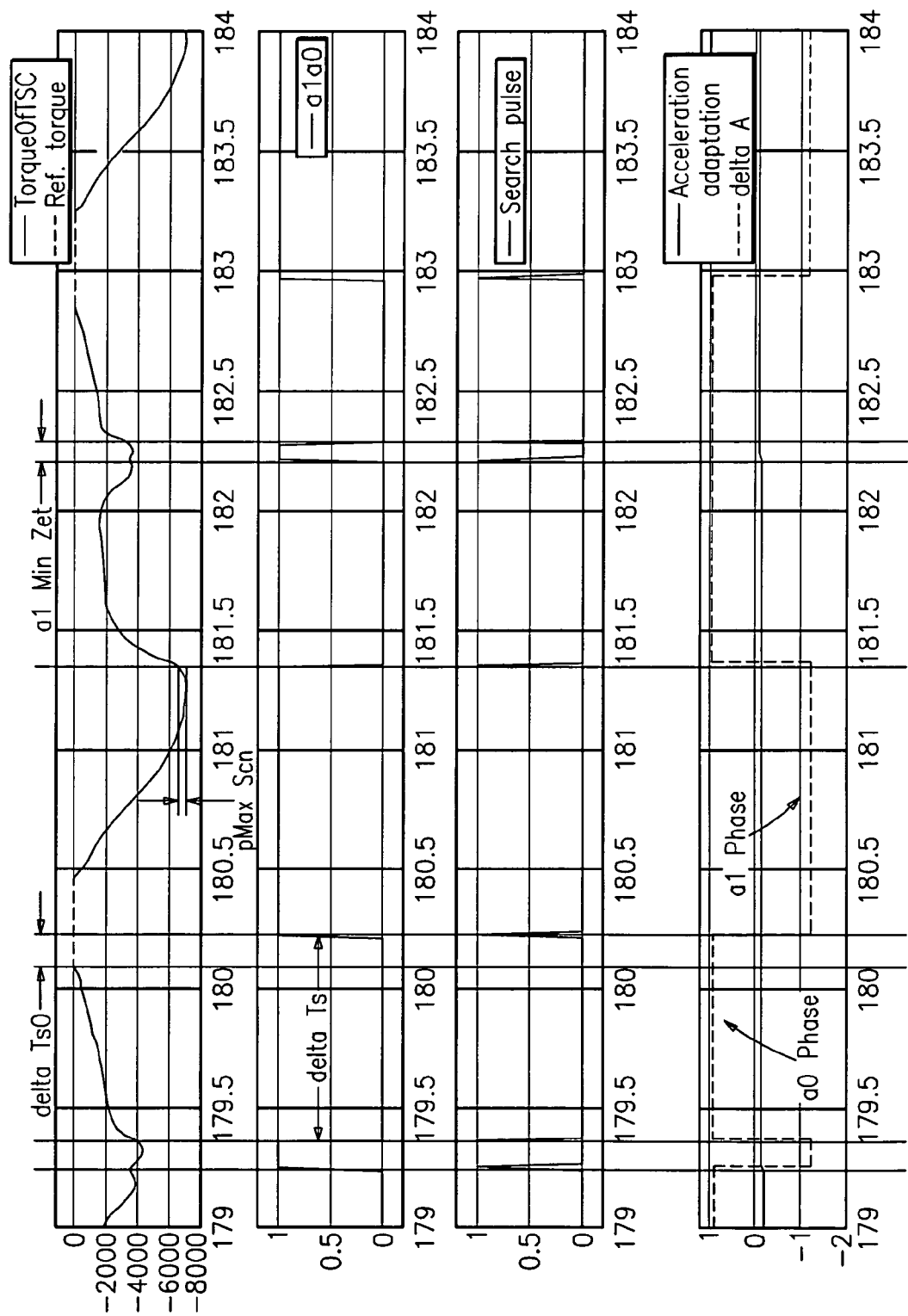
FIG. 13: a diagram showing the torque extent during the search operation of the control device in accordance with an advantageous embodiment of the invention and illustrating its mode of operation.

After the recognition of the maximum, an a0 phase is initiated and the acceleration is thus reduced (phase 2), cf. FIG. 13. Compensation procedures of the transmission and the tires now take place since now the wheel speed reduces with respect to the vehicle speed. So that vibrations in the powertrain arising in this connection are not yet evaluated, a minimum of the torque is first searched for which is evaluated in the same way as the maximum. If a minimum is recognized, it can be assumed that the slip moves in the direction of smaller values and thus again in the direction of the operating point. The max value store is reinitialized with the recognition of the minimum and the control is then in phase 3. The a0 phase is now maintained for so long until the operating point is again passed through which again detects a maximum. Subsequently, the current operating point is located to the left of the optimum operating point and an a1 phase can again be initiated, cf. FIG. 13.

Since it can occur that no minimum is found, the duration of the a0 phases is also limited by two time limits. On the one hand, the maximum period of the a0 phase is limited by deltaTs and the maximum duration, in which 0 torque is set, is limited by deltaTs0. The shorter these times are, the more the control can be oriented toward blocking wheels in the braking case or toward spinning wheels in the drive case. This is necessary in practical use since the control could tend not to build up any torque in the event of a malfunction of the searching logic or with surfaces which are difficult to detect.

There is equally a minimum time for the a1 phase a1MinTime to mask any vibrations in the powertrain shortly after the changeover.

The increase speed of Msoll* is limited by a gradient limitation. It damps any arising vibrations in the powertrain and minimizes the wear of the transmission. In addition, it makes a DT1 portion of the speed controller and an DT1 monitoring superfluous.

The concept of the wheel slip control for the maximum utilization of force transmission is in particular characterized by the following points:

A PIDT1 speed controller could be reduced to a PI controller due to the introduction of a gradient limitation and a DT1 monitoring can be dispensed with.

An integrator overflow is prevented by a taking along of n* at n and it results in the so-called sampling procedure in limitation operation which substantially improves the reaction friendliness of the control.

For the recognition of a minimum or maximum, a percentage value is introduced instead of a fixed torque difference, said percentage value substantially improving the changeover between the a0 and the a1 phase and taking account of the high torque range in mining trucks.

The wheel slip control is designed such that it can only intervene passively and is thus adapted to the safety demands of mining trucks.

The mean value is used instead of a predictor for the calculation of the adapted acceleration.

The alignment of the adapted acceleration with the theoretically possible acceleration provides a substantial improvement in the adapted value.

The introduction of the time limit deltaTs0 substantially improves the reaction friendliness of the control and is meaningful since it can be assumed without torque that the wheel again rolls freely and is thus again in the stable range of the slip characteristic.

The additional limitation of the value Msoll** substantially improves the reaction friendliness of the control on a change between a0 and a1 phases.

The control is optimized to the extent that it functions reliably despite the very high drive dynamics of a mining truck. In addition, the control is realized in a time discrete manner with a fairly long cycle time of 20 ms.

The control is able to cope with gradients +/−10%.

Since mining trucks are driven by two or more single drives which are not coupled mechanically, e.g. by a differential transmission, a differential control is implemented in a further development of the invention which guides the wheel speeds of the individual drives with respect to one another and in dependence on the steering angle.

Figure 14:
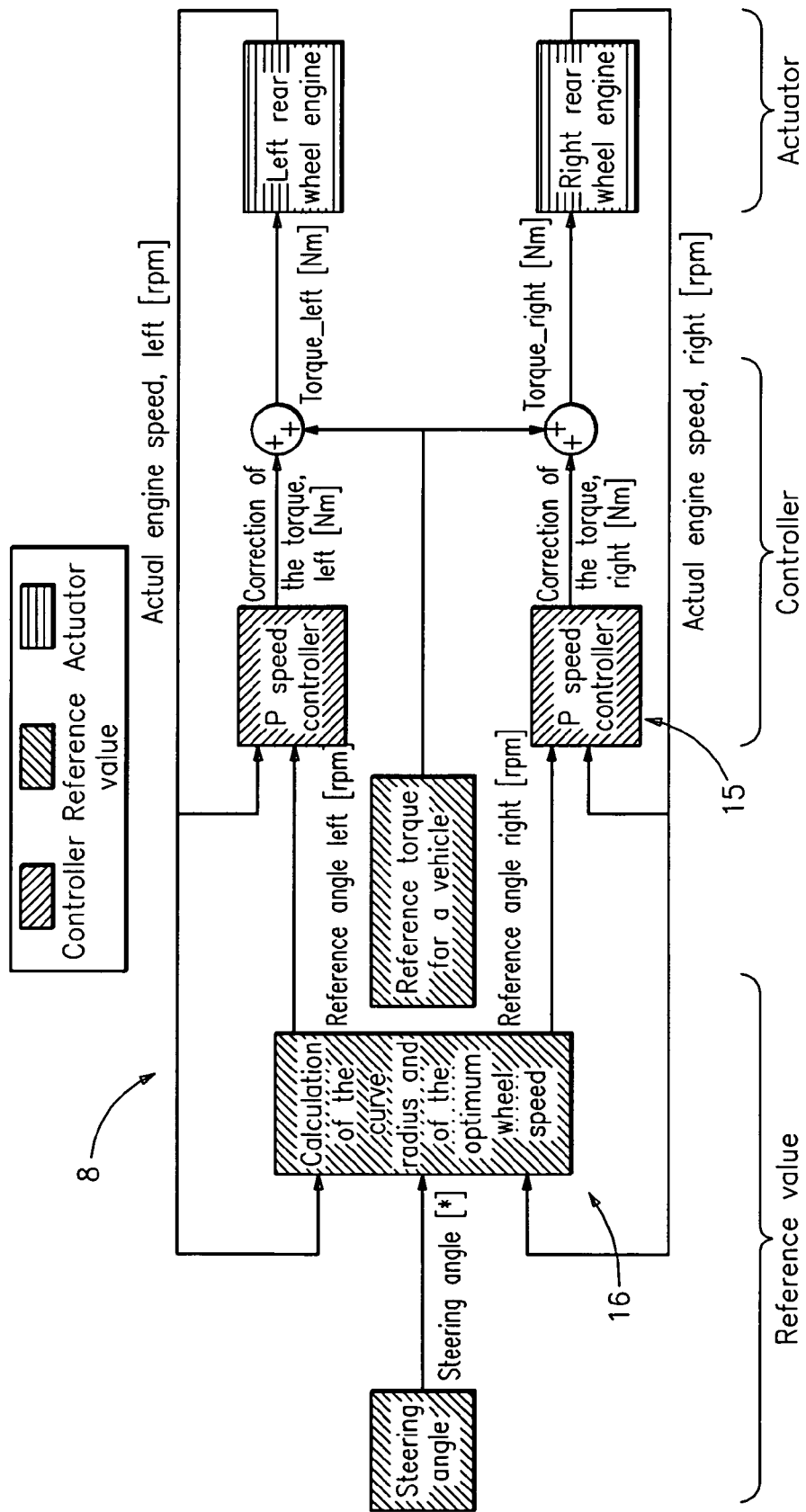
FIG. 14: a schematic total representation of the electronic differential control in accordance with an advantageous embodiment of the invention without the wheel slip control.

In FIG. 14, an overview is shown for a two-motor drive which can, however, also be extended to as many drives as required. Since no desired speed value is set by the operator, but rather a desired torque value, the guiding of the wheel speeds is only possible by an underlying speed control which is realized in this case via a precontrolled P controller. The driving experience of a torque-controlled drive is thus maintained and the underlying speed control can nevertheless guide the individual drives with respect to one another.

Figure 15:
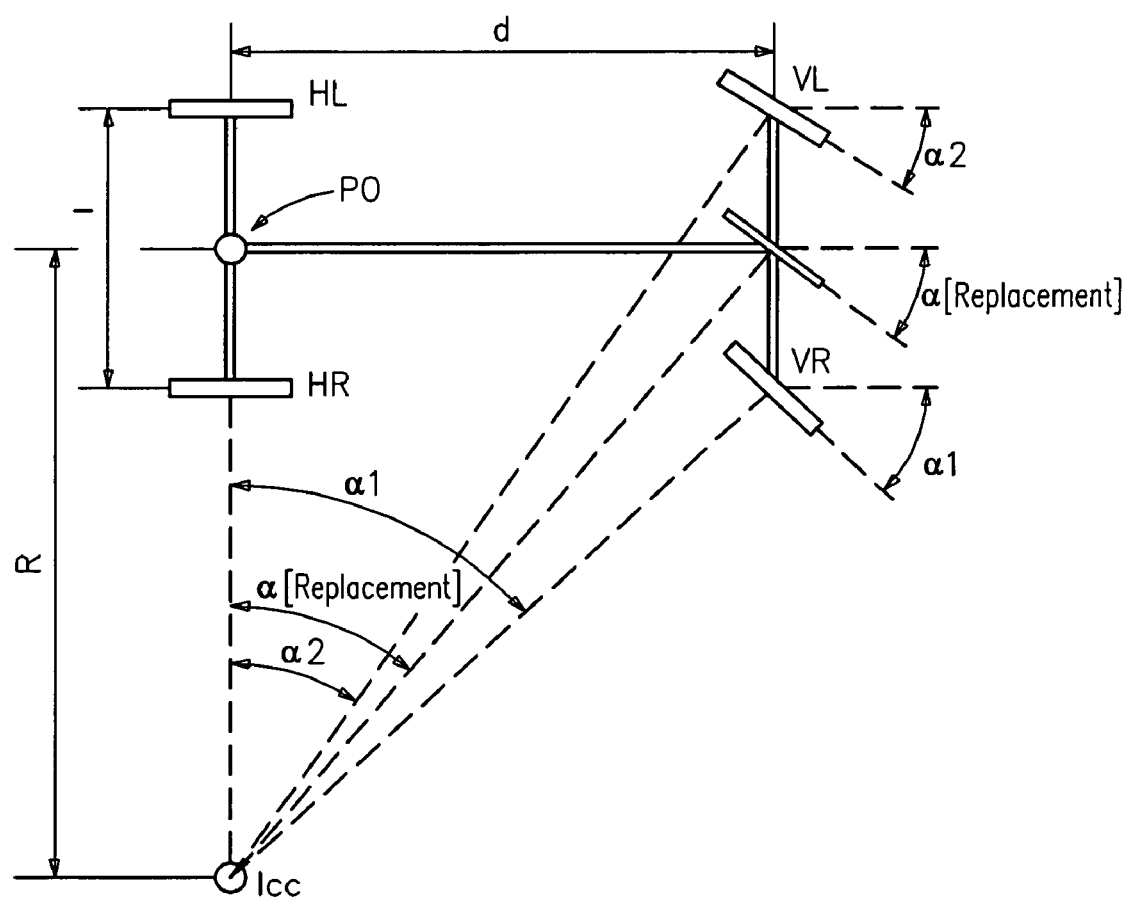
FIG. 15: a schematic representation of the steering geometry of the large dump truck according to the Ackermann principle.

The steering geometry of steerable wheeled vehicles such as large dump trucks can be designed according to the Ackermann principle, as FIG. 15 shows. All tangents of all wheels accordingly intersect at a point, the so-called Icc (instantaneous center of curvature). The trajectory radii of all wheels can therefore be calculated when the steering angles of the steerable wheels are known.

The radius R of the curve movement can be calculated as follows:

$$R = \frac{d}{\tan\alpha_{Ersatz}}; \left(R - \frac{1}{2}\right) = \frac{d}{\tan\alpha 1}; \left(R + \frac{1}{2}\right) = \frac{d}{\tan\alpha 2}$$

($d$ = center distance, $1$ = track width)

(d=center distance, l=track width)

The angular speed of the vehicle around the Icc (instantaneous center of curvature), cf. FIG. 15, is then calculated as:

$$\omega_{Icc} = \frac{V_{Ersatz}}{\sqrt{d^2 + R^2}} = \frac{V_{HR}}{\left(R - \frac{1}{2}\right)} = \frac{V_{HL}}{\left(R + \frac{1}{2}\right)} = \frac{V_{P0}}{R}$$

The angular speed of the wheels is calculated as:

$$V_{HL} = r_{wheel} \cdot \omega_{HL}; \quad V_{HR} = r_{wheel} \cdot \omega_{HR}; \quad V_{P0} = r_{wheel} \cdot \omega_{P0}$$

The optimum wheel speeds can now be calculated using the curve radius of the vehicle center known by the vehicle geometry and the current steering angle:

$$\frac{\omega_{HR}}{\left(R - \frac{1}{2}\right)} = \frac{\omega_{HL}}{\left(R + \frac{1}{2}\right)} = \frac{\omega_{P0}}{R}$$

Since no desired value is present for $\omega_{P0}$, in torque controlled operation, $\omega_{P0}$ must be calculated from the current wheel speeds. For this purpose, the individual wheel speeds are transformed at the point P0 and the mean value of $\omega_{P0}$ is formed.

$$\omega_{P0,HR} = \frac{\omega_{HR} \cdot R}{\left(R - \frac{1}{2}\right)}; \omega_{P0,HL} = \frac{\omega_{HL} \cdot R}{\left(R + \frac{1}{2}\right)}; \omega_{P0} = \frac{\omega_{P0,HR} + \omega_{P0,HL}}{2}$$

From the now known value $\omega_{P0}$, the optimum wheel speeds can then be calculated for the individual drives.

$$n_{HR} = \frac{30}{\pi} \cdot \frac{\omega_{P0} \cdot \left(R - \frac{1}{2}\right)}{R}; n_{HL} = \frac{30}{\pi} \cdot \frac{\omega_{P0} \cdot \left(R + \frac{1}{2}\right)}{R};$$

As shown, the optimum wheel speeds for each wheel can be calculated from the vehicle geometry, the steering angle and the current wheel speeds. These calculated optimum wheel speeds can only be changed by a ramp. The gradient of the ramp is defined by:

$$\frac{dw_{Rad} \cdot r_{rad}}{dt} = \frac{dv_{Rad}}{dt} = a_{Rad}$$

The wheel acceleration can thereby be additionally limited, which results in a better force transmission and thus minimizes the skidding or the blocking of the wheels. In addition, the skidding or the blocking of individual wheels is prevented since the speeds of all driven wheels are guided with respect to one another and the breaking out of individual wheel speeds is thus prevented. The differential control is thus a part of the total wheel slip control concept. The actual wheel slip control therefore only has to intervene when the wheels tend to skid and to block despite the minimized wheel acceleration and all the wheels start this simultaneously.

To ensure an optimum intervention of the precontrolled P controller at all times, the P factor of the controller is proportionally coupled to the desired torque value. The magnitude of the controller correction value thus increases with the magnitude of the desired torque.

The following relationship thus results for the resulting torque:

$$M_{Res} = M_{soll} + \left(n_{delta} \cdot (K_p \cdot |M_{soll}|) \Big|_0^{K_{P,Max}}\right)$$

To satisfy the safety requirements for mining trucks, this control only operates passively. The following relationship thus results:

$$M_{soll} > 0 \rightarrow M_{Res} \Big|_0^{T_{Max}}$$
$$M_{soll} < 0 \rightarrow M_{Res} \Big|_{-T_{Max}}^0$$

The advantage furthermore results by the calculation procedure of $\omega_{P0}$ that the total traction force is maintained as long as sufficient torque reserves are present. If the wheel speeds differ from the optimum wheel speeds, one wheel is slowed as a rule, while the other wheel is accelerated. The following relationship thus results:

$$T_{Res,HL} + T_{Res,HR} \approx 2 \cdot T_{soll}$$

The differential control thereby does not cause any traction force loss.

The control also always works correctly with very different surfaces between the left and right wheels due to the speed controlled concept of the differential control; unlike other concepts which build up a yaw momentum in dependence on and in the direction of the steering angle. If e.g. the rolling resistance of the wheel at the inside of the curve is much larger than that at the outside, this results in oversteer. In this case, the yaw momentum or the drives must act against the steering direction instead of with the steering direction as in the normal case. This is ensured by the speed controlled concept of differential control. It thus substantially contributes to the driving stability and thereby approximately has ESP properties.

The arising yaw momentums additionally relieve the forces on the steering mechanism and the front tires, whereby the wear is reduced.

The advantages of the combined differential and wheel slip control are the following:

The wheel slip control only requires the current speed signal of the drive motors and no additional sensor system.

The control works independently of the surface property.

The control can react to fast changing surface conditions.

The control also recognizes slowly starting skid or blocking procedures.

The control also recognizes skid or blocking procedures when all wheels start them together.

The control does not require any information on the current vehicle weight or current gradient relationships.

When driving, the control works like an ASR and when braking like an ABS system.

The driving stability increased during trips straight ahead and in corners due to the control because the driving wheels are in the ideal slip range and the optimum lateral force is thus always maintained.

The control reduces the tire wear of the front wheels and the wear of the steering mechanism since the cornering is supported by the produced yaw momentum of the rear axle.

The control reduces the tire wear of the rear wheels because the pushing via the rear wheels is minimized and increases the effectiveness of the total drive system because the travel resistances are reduced.

The control works over the total speed range of the vehicle.

Figure 16:
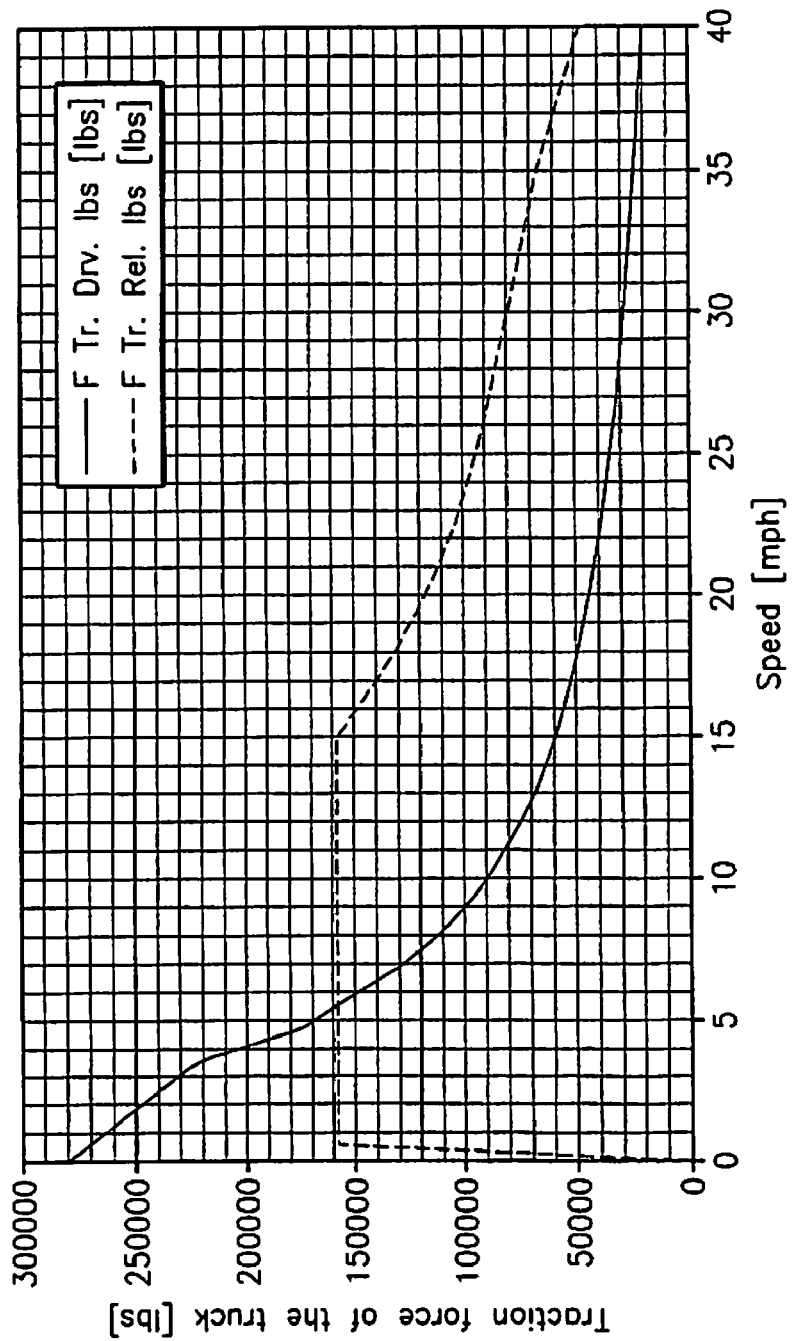
FIG. 16: a representation of the functional relationship between the driving speed and the traction force in accordance with an old concept of a stop function.

Modern diesel-electrically driven mining trucks must be able to generate high traction forces and braking forces with electrical drives. The braking process should take place purely electrically without the help of mechanical brakes. The mechanical braking system of the truck should only be used as a hand brake or as an emergency brake. Since mining trucks are controlled via a torque set by the driver, the electrical braking is not easily possible up to a stationary position since the electrical braking torque is an active torque and not a reaction torque, like the friction torque of a mechanical brake. The electrical torque has to be actively controlled to the existing load torque in the stationary position by this property. Older concepts as shown in FIG. 16 provided for the torque limit of the braking torque to be limited to 0 Nm at 0 rpm. However, only a standstill on a straight surface is thus possible and influences of the mass accelerations are also not taken into account. A stop was therefore only possible with the additional use of a mechanical brake and is very rough due to the environmental conditions not being taken into account. A concept should be presented here in the following that solves these problems with the help of a changing over speed controller. This was not possible previously because a speed control was hardly possible near standstill due to the low resolution of the speed encoder. To nevertheless make a control possible around the zero point, a new encoder evaluation is advantageously provided which increases the resolution.

A so-called encoder is usually used for the detection of the speed of an electric motor. This generates a specific number of pulses (track A) per revolution, cf. FIG. 17. It is then possible to determine the speed from the time interval between two pulses.

Figure 17:
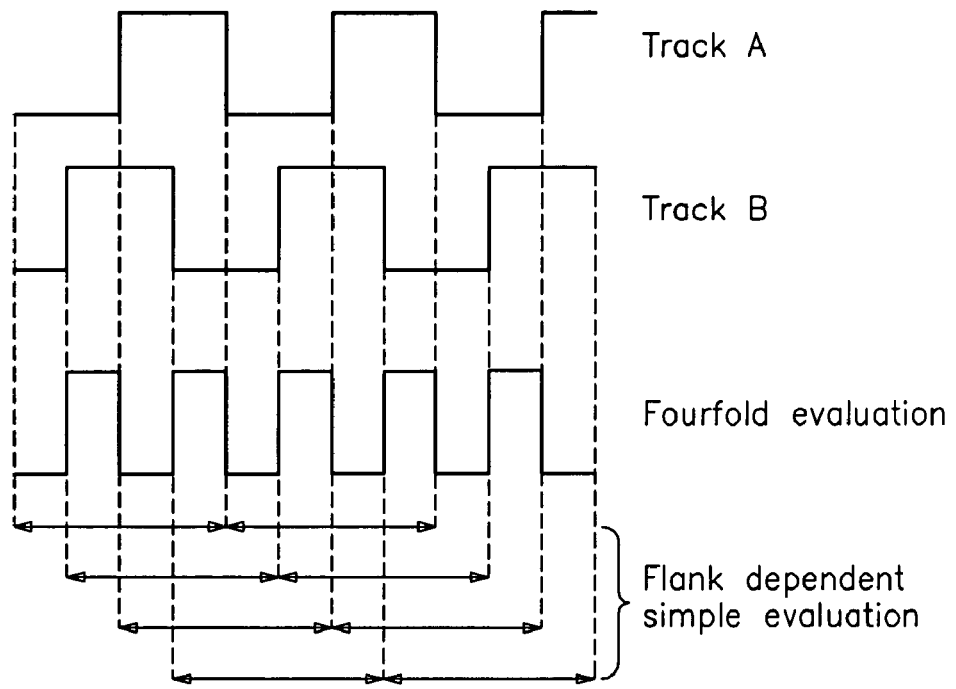
FIG. 17: a schematic representation of the signal traces of an encoder with a sampling ratio of 50%.

In order also to be able to detect the direction of rotation in addition to the speed, the encoder generates a second track with pulses offset by 90° (track B), cf. FIG. 17.

If both tracks are offset precisely by 90° and have a duty cycle of 50%, a signal which generates four flanks for each period of track A can be generated with the help of an exclusive or link of track A and track B.

A new speed value can only be calculated at a flank of a signal since it is not known in intermediate space how far the path to the next flank is. Since more flanks are present in the above-mentioned signal obtained by an exclusive or link, the speed can be determined more frequently with this signal. This is termed a fourfold evaluation.

The demand for a sampling ration of 50% can hardly be satisfied with speed sensors which have to be rugged with respect to mechanical strains. Speed-dependent deviations of the sampling ratio from 50% in particular occur with magnetic sensors used in the traction sector. This results in a distorted signal of the fourfold sampling. This signal can no longer be used for the calculation of the speed since the pulses are no longer uniformly distributed with an unchanged rotary speed.

This cannot be subsequently compensated due to the speed dependence of the flank displacement.

Figure 18:
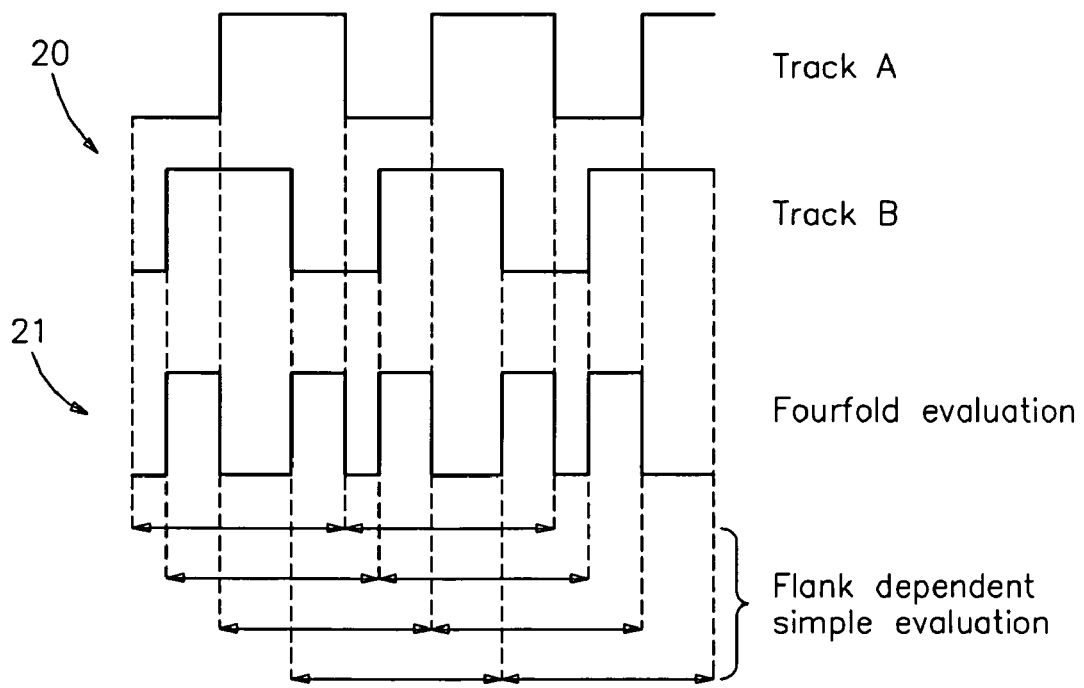
FIG. 18: a schematic representation of the signal traces of an encoder with a sampling ratio different from 50%, with the flank-dependent simple evaluation of the signal traces being shown.

In both cases, the time interval from a rising flank of track A to the next rising flank of the same track can, however, be used for the calculation of the speed, namely in particular by a so-called simple scanning, cf. FIG. 18. This time interval remains the same with a constant speed independently of the sampling ratio. A small error, which can, however, normally be neglected, only arises while the sampling ratio changes.

The intervals of the falling flanks of track A with respect to one another and the respective intervals of the falling or rising flank of track B with respect to one another can also be used for the speed calculation, cf. FIG. 18.

In a further development of the invention, provision is made not to use the signal gained by the exclusive or link for the fourfold evaluation, but to carry out the four possible flank-dependent simple evaluations in parallel. A new speed value can thus be calculated just as frequently as with the fourfold evaluation without having to make any limitations in the sampling ratio of the track signals. An improved quality of the control is in particular the result at small speeds and thus at few pulses per time unit.

Figure 19:
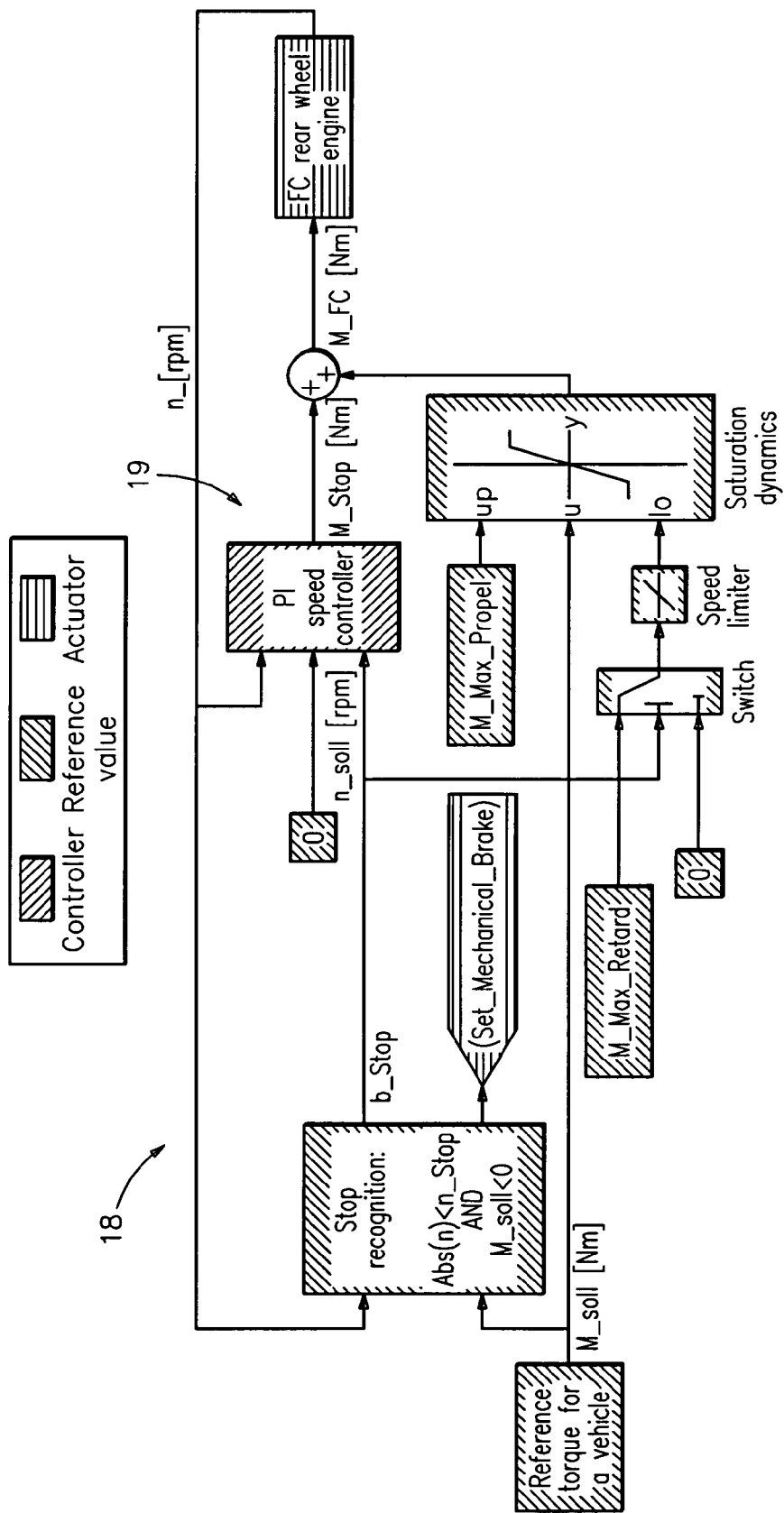
FIG. 19: a schematic total view of the stop control of the control device of the large dump truck in accordance with a preferred embodiment of the invention.

The stop control which is shown in an overview in FIG. 19 should maintain the drive electrically at a speed of 0 rpm when M_soll (the operator actuates the retard pedal) is negative and the speed n is smaller than the limit n_Stop.

If the stop control is active, it is necessary to change from torque controlled operation to a speed controlled operation. These two operating modes should overlap smoothly, i.e. without jolts, on the change so that the change cannot be noticed when driving and thus a similar driving experience arises as on braking with a mechanical brake. Attempts to initialize the PI controller on the changeover to the last desired value M_soll admittedly resulted in a seamless transition, but the PI controller was not able to reduce the torque fast enough with large values of M_soll and the truck therefore traveled backward for a little until it came to a standstill.

An initialization with 0 Nm resulted in a brief loss of traction force and thus in a jolt and not in a seamless transition.

This problem was therefore solved by a precontrolled PI controller.

As long as the stop conditions are not satisfied, the PI controller is initialized to 0 Nm and only the precontrol parameter M_soll is operative. As soon as the stop condition is satisfied, the initialization is removed and the PI controller starts to control. At the same time, M_soll is limited to 0 Nm. This limitation can, however, only be changed via a ramp. This has the result that the torque M_soll is removed in a linear manner. The controller output M_Stop and the torque M_soll thereby overlap shortly after the switch-on procedure. A jolt-free changeover thus results. The reduction of M_soll thus takes place independently of the PI controller and can be set via the ramp steepness. A jolt-free stop procedure was thus achieved without a rolling backward of the truck.

The operator moreover has the possibility of triggering the mechanical brake in that the retard pedal is depressed more than 90%. The mechanical brake is activated by the stop control when the stop control has controlled the speed to below 20 rpm. The closing of the mechanical brake thereby takes place almost free of jolts since hardly any braking force is required. This moreover reduces the wear of the mechanical brake.

Modern diesel-electrically driven mining trucks have an unfavorable center of gravity, particularly in the fully loaded state, due to the large tire diameter and the design of the frame. Said center of gravity is too high and too far back. This can result in a rearward rollover of the truck on rolling backward downhill and with a subsequent braking. A backward rolling of the truck must therefore be prevented by the truck control. Earlier concepts made provision for the mechanical brake to close on a backward rolling and only to open it again when the engine torque exceeds a torque threshold which is large enough to accelerate the truck forward at the largest permitted gradient. This, however, results in a rough start procedure and an excessive wear of the brakes with smaller gradients. In accordance with a further aspect of the present invention, this problem is solved with the help of a speed controller which changes over. Speed control near to standstill was hardly possible previously in particular due to the low resolution of the speed encoder. In order nevertheless to make a control around the zero point possible, the previously described encoder evaluation can therefore also be used which increases the resolution.

Figure 20:
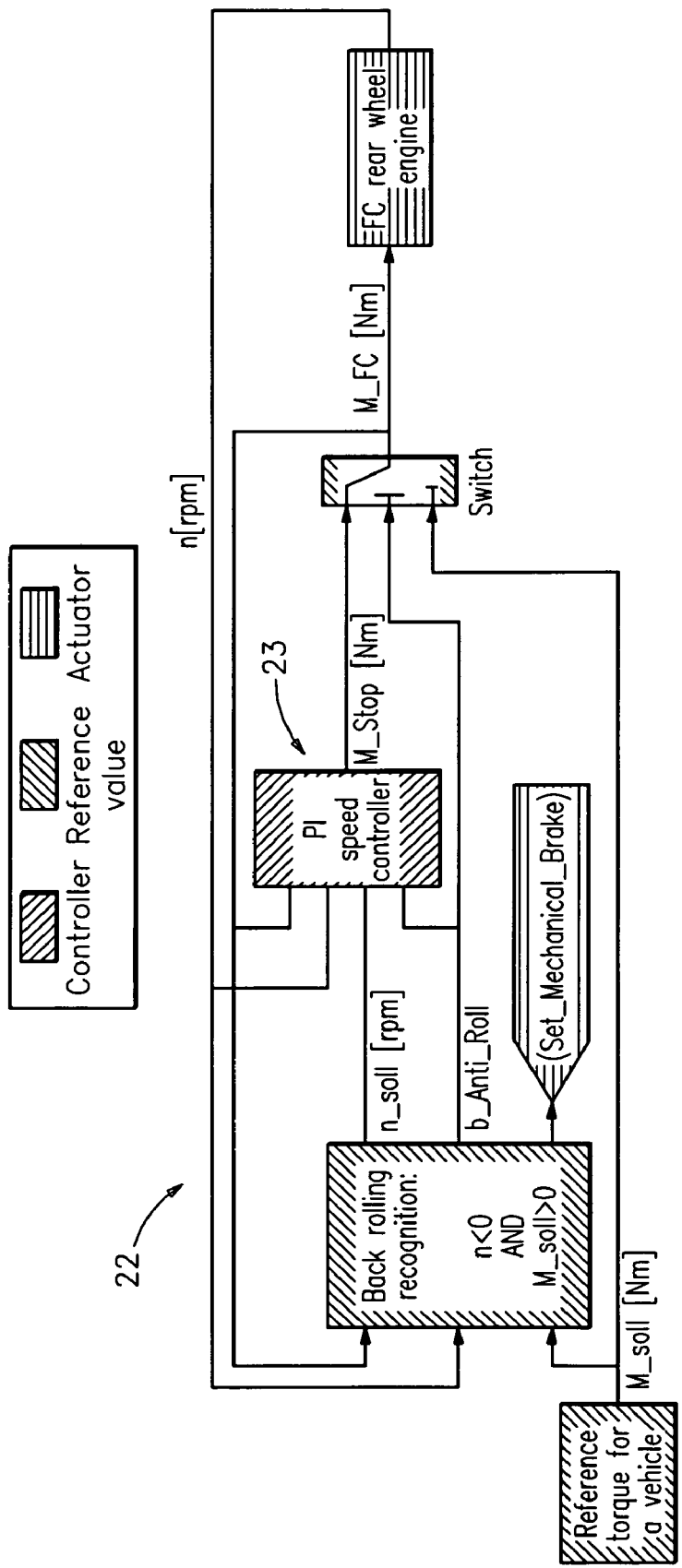
FIG. 20: a schematic total representation of the anti-backward rolling control of the control device of the large dump truck in accordance with an advantageous embodiment of the invention.

The anti-roll back control, which is shown in total in the overview in FIG. 20, should prevent the backward rolling of the truck electrically.

There are two different kinds of backward rolling and therefore two different operative modes for the anti-roll back control:

In a first case, the hand brake is not closed, no pedal is actuated by the operator and the truck starts to roll.

In a second case, the operator wants forward acceleration, but has set too low a desired torque to accelerate the truck forward and the truck therefore starts to roll backward.

In the first case, as described above, the truck starts to roll backward and no desired torque is applied. In this case, the PI controller is initialized and activated at 0 Nm. The PI controller now controls the speed to 0 rpm, then stores the required torque for this and activates the mechanical brake. The mechanical brake is now only opened when the torque of the drives is larger than the stored torque of the control. It is thereby achieved that only so much torque is built up against the brake which is required for the forward acceleration. This substantially reduces the brake wear since the brake is only closed when almost 0 speed is present and only so much engine torque is built up against the brake as is required during starting off.

In the second case, as described above, the operator did not depress the accelerator pedal far enough to accelerate the truck forward and the truck therefore starts to roll backward even though the operator actually wanted to drive forward. In this case, the PI controller is initialized and activated with the desired torque of the operator (M_soll). The PI controller now controls to a small forward speed and thus moves the truck in the direction desired by the driver. The PI controller now remains active for so long until the torque set by the driver is larger than the torque calculated by the PI controller. It is thus ensured that the truck now travels forward controlled by the operator and that the use of the mechanical brake is not necessary.

The invention claimed is:

1. A truck having a chassis (2) with wheels (3),
a plurality of said wheels (3) each having a single wheel drive (4), and
a control device (5) for the control of the speed and/or of the torque of the single wheel drives (4), wherein
the control device (5) has a separate control train (6, 7) for each single wheel drive (4) and divides a desired torque (Msoll) set by the operator to the control trains (6, 7),
with each control train (6, 7) having a differential controller (8) for the correction of the divided desired torque (Msoll) in dependence on a steering angle (α) and provision of a correspondingly corrected desired torque ($M_{res}$), and
a wheel slip controller (9) for the correction of the divided desired torque and/or corrected desired torque ($M_{res}$) in dependence on a wheel slip and provision of a single wheel drive desired ($_{Msoll}$*), and
being free of mechanical differentials between the single wheel drives.

2. A truck having a chassis (2) with wheels (3), a plurality of said wheels (3) each having a single wheel drive (4), and a control device (5) for the control of the speed and/or of the torque of the single wheel drives (4), wherein
the control device (5) has a separate control train (6, 7) for each single wheel drive (4) and divides a desired torque (Msoll) set by the operator to the control trains (6, 7),
with each control train (6, 7) having a differential controller (8) for the correction of the divided desired torque (Msoll) in dependence on a steering angle (α) and provision of a correspondingly corrected desired torque ($M_{res}$), and
a wheel slip controller (9) for the correction of the divided desired torque and/or corrected desired torque ($M_{res}$) in dependence on a wheel slip and provision of a single wheel drive desired ($_{Msoll}$*), and
the wheel slip controller (9) has a speed controller (10) for the determination of a desired torque in dependence on a difference of an actual wheel speed (n) and a desired wheel speed (n*).

3. The truck in accordance with claim 2, wherein the speed controller (10) is made as a PI controller.

4. The truck in accordance with claim 2, wherein
a desired wheel speed sensor (11) for the determination of the desired wheel speed (n*) in dependence on a desired wheel value and/or a desired vehicle acceleration value is connected before the speed controller (10).

5. The truck in accordance with claim 4, wherein
the desired wheel speed sensor (11) determines the desired wheel speed (n*) by integration of the desired wheel value and/or the desired vehicle acceleration value (a*) over time.

6. The truck in accordance with claim 4, wherein
a desired acceleration value sensor (12) for the determination of a desired acceleration value (a*) is connected before the desired wheel speed sensor (11).

7. The truck in accordance with claim 6, wherein
the desired acceleration value sensor (12) has an acceleration adaptation stage (13) which corrects an acceleration stroke value in dependence on an actual vehicle acceleration.

8. The truck in accordance with claim 7, wherein
the acceleration adaptation stage (13) determines the vehicle acceleration from a wheel set acceleration and/or from the difference of a plurality of wheel speeds (n(t1), n(t2) . . . ) stored at different times.

9. The truck in accordance with claim 8, wherein
the adapted acceleration value (a_ad) determined from the wheel set acceleration and/or from the difference of the wheel speeds stored at different times is corrected in dependence on previously carried out desired acceleration value adaptations.

10. The truck in accordance with claim 9, wherein
the adapted acceleration value (a_ad) is determined with reference to the following relationship $$a\_ad = \frac{a\_ad(t2) + a\_ad(t1)}{2}$$

where $$a\_ad(t2) = \frac{2 \cdot \pi \cdot r_R}{\ddot{u}} \cdot \frac{n(t2) - n(t1)}{t2 - t1}.$$

11. A truck having a chassis (2) with wheels (3),
a plurality of said wheels (3) each having a single wheel drive (4), and
a control device (5) for the control of the speed and/or of the torque of the single wheel drives (4), wherein
the control device (5) has a separate control train (6, 7) for each single wheel drive (4) and divides a desired torque (Msoll) set by the operator to the control trains (6, 7),
with each control train (6, 7) having a differential controller (8) for the correction of the divided desired torque (Msoll) in dependence on a steering angle (α) and provision of a correspondingly corrected desired torque ($M_{res}$), and
a wheel slip controller (9) for the correction of the divided desired torque and/or corrected desired torque ($M_{res}$) in dependence on a wheel slip and provision of a single wheel drive desired ($_{Msoll}$*), and
the wheel slip controller (9) has a gradient limiter (14) for the limitation of the desired torque ($M_{Soll}$*) in dependence on the gradient of the time course of the desired torque.

12. A truck having a chassis (2) with wheels (3),
a plurality of said wheels (3) each having a single wheel drive (4), and
a control device (5) for the control of the speed and/or of the torque of the single wheel drives (4), wherein the control device (5) has a separate control train (6, 7) for each single wheel drive (4) and divides a desired torque (Msoll) set by the operator to the control trains (6, 7), with each control train (6, 7) having a differential controller (8) for the correction of the divided desired torque (Msoll) in dependence on a steering angle ($\alpha$) and provision of a correspondingly corrected desired torque ($M_{res}$), and a wheel slip controller (9) for the correction of the divided desired torque and/or corrected desired torque ($M_{res}$) in dependence on a wheel slip and provision of a single wheel drive desired ($_{Msoll}*$), and the wheel slip controller (9) works independently of speed signals of non-driven wheels and/or works solely in dependence on speed signals of the driven wheels (3) to be controlled.

13. A truck having a chassis (2) with wheels (3), a plurality of said wheels (3) each having a single wheel drive (4), and a control device (5) for the control of the speed and/or of the torque of the single wheel drives (4), wherein the control device (5) has a separate control train (6, 7) for each single wheel drive (4) and divides a desired torque (Msoll) set by the operator to the control trains (6, 7), with each control train (6, 7) having a differential controller (8) for the correction of the divided desired torque (Msoll) in dependence on a steering angle ($\alpha$) and provision of a correspondingly corrected desired torque ($M_{res}$), and a wheel slip controller (9) for the correction of the divided desired torque and/or corrected desired torque ($M_{res}$) in dependence on a wheel slip and provision of a single wheel drive desired ($_{Msoll}*$), and the wheel slip controller (9) works independently of information on the current vehicle weight and independently of information on the current road gradient.

14. A truck having a chassis (2) with wheels (3), a plurality of said wheels (3) each having a single wheel drive (4), and a control device (5) for the control of the speed and/or of the torque of the single wheel drives (4), wherein the control device (5) has a separate control train (6, 7) for each single wheel drive (4) and divides a desired torque (Msoll) set by the operator to the control trains (6, 7), with each control train (6, 7) having a differential controller (8) for the correction of the divided desired torque (Msoll) in dependence on a steering angle ($\alpha$) and provision of a correspondingly corrected desired torque ($M_{res}$), and a wheel slip controller (9) for the correction of the divided desired torque and/or corrected desired torque ($M_{res}$) in dependence on a wheel slip and provision of a single wheel drive desired ($_{Msoll}*$) and, the differential controller (8) has a speed controller (15) for the determination of the corrected desired torque ($M_{res}$) in dependence on a difference of the actual wheel speed (n) and a desired wheel speed ($n_{HR}$, $n_{HL}$).

15. The truck in accordance with claim 14, wherein the speed controller (15) is a P controller.

16. The truck in accordance with claim 15, wherein
the P factor of the speed controller (15) is coupled proportionally to the desired torque value and the corrected desired torque ($M_{res}$) is determined using the following relationship $$M_{Res} = M_{soll} + \left(n_{delta} \cdot (K_p \cdot |M_{soll}|)\big|_0^{K_{P,Max}}\right).$$

17. A truck having a chassis (2) with wheels (3), a plurality of said wheels (3) each having a single wheel drive (4), and a control device (5) for the control of the speed and/or of the torque of the single wheel drives (4), wherein the control device (5) has a separate control train (6, 7) for each single wheel drive (4) and divides a desired torque (Msoll) set by the operator to the control trains (6, 7), with each control train (6, 7) having a differential controller (8) for the correction of the divided desired torque (Msoll) in dependence on a steering angle ($\alpha$) and provision of a correspondingly corrected desired torque ($M_{res}$), and a wheel slip controller (9) for the correction of the divided desired torque and/or corrected desired torque ($M_{res}$) in dependence on a wheel slip and provision of a single wheel drive desired ($_{Msoll}*$), and a speed controller (15) having a desired speed sensor (16) for the determination of the desired wheel speed ($n_{HR}$, $n_{HL}$) in dependence on the current wheel speeds of a plurality of wheels, on the chassis geometry.

18. The truck in accordance with claim 17, wherein
the desired speed sensor (16) transforms the current wheel speeds in each case at a point (p0) between the corresponding wheels, averages the transformed wheel speeds and determines the desired speeds of the respective wheels from the averaged, transformed wheel speeds.

19. The truck in accordance with claim 17, wherein the speed sensor (16) determines the desired wheel speed ($n_{HR}$, $n_{HL}$) in dependence on chassis track width (l), center distance (d), and steering angle ($\alpha$).

20. A truck having a chassis (2) with wheels (3), a plurality of said wheels (3) each having a single wheel drive (4), and a control device (5) for the control of the speed and/or of the torque of the single wheel drives (4), wherein the control device (5) has a separate control train (6, 7) for each single wheel drive (4) and divides a desired torque (Msoll) set by the operator to the control trains (6, 7), with each control train (6, 7) having a differential controller (8) for the correction of the divided desired torque (Msoll) in dependence on a steering angle ($\alpha$) and provision of a correspondingly corrected desired torque ($M_{res}$), a wheel slip controller (9) for the correction of the divided desired torque and/or corrected desired torque ($M_{res}$) in dependence on a wheel slip and provision of a single wheel drive desired ($_{Msoll}*$), and a differential controller (8) having a ramp stage for the determination of the desired wheel speed with reference to an acceleration ramp for the change in the desired wheel speed.

* * * * *